(12) United States Patent
Ikemoto et al.

(10) Patent No.: US 9,210,647 B2
(45) Date of Patent: Dec. 8, 2015

(54) ROUTE INFORMATION RELAY METHOD AND WIRELESS TERMINAL

(75) Inventors: Kentaro Ikemoto, Kawasaki (JP); Tomoyoshi Takebayashi, Kawasaki (JP); Toshihiro Sonoda, Kawasaki (JP); Shigehiro Idani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 746 days.

(21) Appl. No.: 12/926,031

(22) Filed: Oct. 21, 2010

(65) Prior Publication Data

US 2011/0038274 A1   Feb. 17, 2011

Related U.S. Application Data

(63) Continuation of application No. PCT/JP2009/058024, filed on Apr. 22, 2009.

(30) Foreign Application Priority Data

Apr. 22, 2008  (JP) ................. 2008-111777

(51) Int. Cl.
*H04W 40/30* (2009.01)
*H04L 12/721* (2013.01)
*H04W 40/12* (2009.01)

(52) U.S. Cl.
CPC ............... *H04W 40/30* (2013.01); *H04L 45/26* (2013.01); *H04L 45/34* (2013.01); *H04L 45/44* (2013.01); *H04W 40/12* (2013.01)

(58) Field of Classification Search
None
See application file for complete search history.

(56) References Cited

U.S. PATENT DOCUMENTS

| | | | |
|---|---|---|---|
| 2001/0024434 A1* | 9/2001 | Ayyagari et al. | 370/347 |
| 2005/0237973 A1* | 10/2005 | Takeda et al. | 370/329 |
| 2008/0170550 A1* | 7/2008 | Liu et al. | 370/338 |
| 2009/0135824 A1* | 5/2009 | Liu | 370/392 |

FOREIGN PATENT DOCUMENTS

| | | |
|---|---|---|
| JP | 2003-152786 | 5/2003 |
| JP | 2006-279660 | 10/2006 |
| JP | 2007-129542 | 5/2007 |
| JP | 2007-288259 | 11/2007 |

OTHER PUBLICATIONS

International Search Report for PCT/JP2009/058024, mailed Jul. 7, 2009.

(Continued)

*Primary Examiner* — Khoa Huynh
(74) *Attorney, Agent, or Firm* — Staas & Halsey LLP

(57) ABSTRACT

Each node connected to an ad hoc network receives route information from an adjacent node. Each node obtains quality information indicating quality of a route indicated by the route information with respect to the received route information. Each node determines whether a plurality of route information items whose packet destination nodes are the same are received at a predetermined frequency. When it is determined that a plurality of route information items whose packet destination nodes are the same are received, each node compares quality information items of the plurality of received route information items, and selects a route information item corresponding to a quality information item indicating a highest quality as a comparison result. Each node relays the selected route information item to an adjacent node.

4 Claims, 24 Drawing Sheets

(56) References Cited

OTHER PUBLICATIONS

Extended European Search Report dated Sep. 24, 2014 in related European Patent Application No. 09735806.3 (5 pages).

"Quality of Service for Ad hoc Optimized Link State Routing Protocol (QOLSR)"; IETF MANET Working Group Internet-DRAFT; Hakim Badis, Khaldoun A. Agha; Project Hipercom, INRIA, France, Mar. 2007 (38 pages).

* cited by examiner

| DESTI-NATION | ADJACENT | ROUTE WEIGHT | LINK WEIGHT | EVALUATION VALUE | PRIORITY | TRANSMISSION FLAG |
|---|---|---|---|---|---|---|
| d | d |  | 50 | 50 | 1 | YES |
| f | f |  | 35 | 35 | 1 | YES |
| e | f | 20 |  | 55 | 1 | YES |
| a | d | 30 |  | 80 | 1 | YES |
| a | f | 60 |  | 95 | 2 | NO |

| ADJACENT | OUTWARD ROUTE EVALUATION VALUE | HOMEWARD ROUTE EVALUATION VALUE | LINK WEIGHT |
|---|---|---|---|
| d | 30 | 20 | 50 |
| f | 25 | 10 | 35 |

FIG.7

| FROM WHO? (TRANSMISSION SOURCE NODE?) d |||
|---|---|---|
| ID | PERIOD | RECEPTION TIME |
| 4 | 0:02 | 0:05 |
| 3 | 0:02 | 0:03 |
| 2 | 0:01 | 0:01 |
| 1 | 0:00 | 0:00 |

| FROM WHO? (TRANSMISSION SOURCE NODE?) f |||
|---|---|---|
| ID | PERIOD | RECEPTION TIME |
| 4 | 0:05 | 0:09 |
| 3 | 0:03 | 0:04 |
| 2 | 0:01 | 0:01 |
| 1 | 0:00 | 0:00 |

| DESTI-NATION | ADJA-CENT | ROUTE WEIGHT | LINK WEIGHT | EVALUATION VALUE | PREVIOUS TRANSMISSION VALUE | PRIORITY | TRANSMISSION FLAG |
|---|---|---|---|---|---|---|---|
| d | d |  | 60 | 60 | 50 | 1 | YES |
| f | f |  | 35 | 35 | 35 | 1 | YES |
| e | f | 20 |  | 55 | 55 | 1 | YES |
| a | d | 30 |  | 90 | 80 | 1 | YES |
| a | f | 60 |  | 95 |  | 2 | NO |

FIG.24

| ID | DESTINATION | ADJACENT | WAITING TIME POINT |
|---|---|---|---|
| 1 | a | d | 10:30 |
| 2 | a | d | 10:31 |
| 3 | a | d | 10:32 |
| 4 | a | d | 10:33 |
| 5 | a | d | 10:34 |

FIG.25

| DESTI-NATION | ADJA-CENT | ROUTE WEIGHT | LINK WEIGHT | EVALUATION VALUE | PRIORITY | TRANSMISSION FLAG | SUCCESS COEFFICIENT |
|---|---|---|---|---|---|---|---|
| d | d |  | 50 | 58 | 1 | YES | 8 |
| f | f |  | 35 | 35 | 1 | YES | 0 |
| e | f | 20 |  | 55 | 1 | YES | 0 |
| a | d | 30 |  | 88 | 1 | YES | 8 |
| a | f | 60 |  | 95 | 2 | NO | 0 |

ROUTE INFORMATION RELAY METHOD AND WIRELESS TERMINAL

CROSS-REFERENCE TO RELATED APPLICATIONS

This application is a continuation of International Application No. PCT/JP2009/058024, filed on Apr. 22, 2009 which claims the benefit of priority from Japanese Patent Application No. 2008-111777, filed on Apr. 22, 2008, the entire contents of which are incorporated herein by reference.

FIELD

The embodiments discussed herein are directed to a route information relay method and a wireless terminal.

BACKGROUND

In recent years, study of an ad hoc network in which wireless terminals are connected to each other in an autonomous and distributed manner progresses. In the ad hoc network, no access point is installed, and each wireless terminal relays a packet received from another wireless terminal (adjacent wireless terminal) connected to the wireless terminal to the adjacent wireless terminal on the basis of route information, and thus routes are formed.

In the ad hoc network, the network environment often changes as a radio field strength changes or a wireless terminal moves. Therefore, each wireless terminal connected to the ad hoc network performs route control before communicating with another wireless terminal.

For example, a case in which the route control is performed by a routing table method will be described. A wireless terminal newly connected to the ad hoc network broadcasts presence information indicating that the terminal is present on the network to the adjacent terminals. Then the adjacent terminals generate route information based on the presence information and broadcast the generated route information to the next adjacent terminals.

For example, each wireless terminal measures route quality between the terminal and the adjacent terminals, and when the terminal relays route information, the terminal relays the route information only to adjacent terminals connected to the terminal via a high-quality route (for example, Japanese Laid-open Patent Publication No. 2003-152786). For example, each wireless terminal broadcasts route information specifying a quality criterion to the adjacent terminals, and when the route quality does not satisfy the quality criterion, the adjacent terminals do not relay the route information (for example, Japanese Laid-open Patent Publication No. 2007-129542).

However, in the conventional techniques described above, the larger the number of wireless terminals connected to the ad hoc network is, the larger the amount of communication to control the route, so that there is a problem that the burden is placed on the network. As described above, each wireless terminal connected to the ad hoc network broadcasts route information to the adjacent terminals and receives response information. Therefore, as the number of the wireless terminals connected to the ad hoc network increases, the number of route information items and response information items increases exponentially, and thus the amount of communication to control the route increases.

SUMMARY

According to an aspect of an embodiment of the invention, a wireless terminal includes a route information receiving unit that receives route information indicating a route through which the packet is transmitted to a destination wireless terminal, from another wireless terminal connected to the wireless terminal; a quality information obtaining unit that obtains quality information indicating quality of a route indicated by the route information with respect to the route information received by the route information receiving unit; a determination unit that determines, at a predetermined frequency, whether a plurality of route information items whose packet destination wireless terminals are the same are received with respect to the route information received by the route information receiving unit; a selecting unit that, when it is determined that a plurality of route information items whose packet destination wireless terminals are the same are received as a result of the determination by the determination unit, compares the quality information items obtained by the quality information obtaining unit for the plurality of received route information items, and selects a route information item corresponding to a quality information item indicating a highest quality as a comparison result; and a relay unit that relays the route information selected by the selecting unit to still another wireless terminal connected to the wireless terminal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram for explaining a period table according to the first embodiment;

FIG. 24 is a diagram for explaining a data management table according to the third embodiment;

FIG. 25 is a diagram for explaining a routing table according to the third embodiment;

DESCRIPTION OF EMBODIMENTS

Preferred embodiments of the present invention will be explained with reference to accompanying drawings. In the description below, first a basic principle of the route information relay method according to a first embodiment will be described, and next, an entire configuration of an ad hoc network according to the first embodiment, a configuration of a wireless terminal (hereinafter referred to as "node"), processing procedure, and an effect of the first embodiment will be described. Thereafter, a second embodiment and a third embodiment will be described.

[a] First Embodiment

Basic Principle of Route Information Relay Method

Figure 1A:
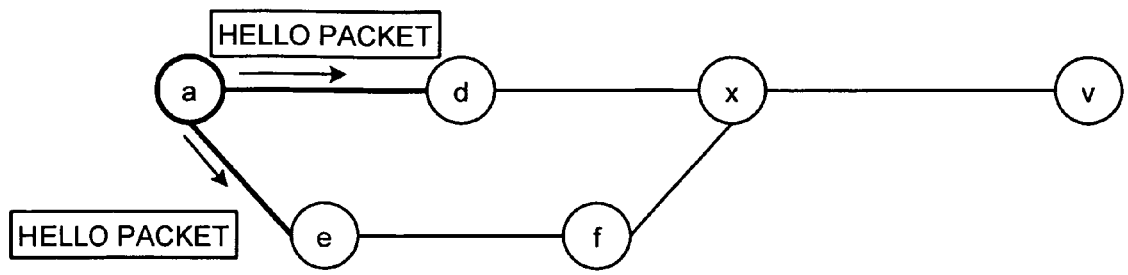
FIGS. 1A to 1C are diagrams for explaining a basic principle of a route information relay method according to a first embodiment.
Figure 1B:
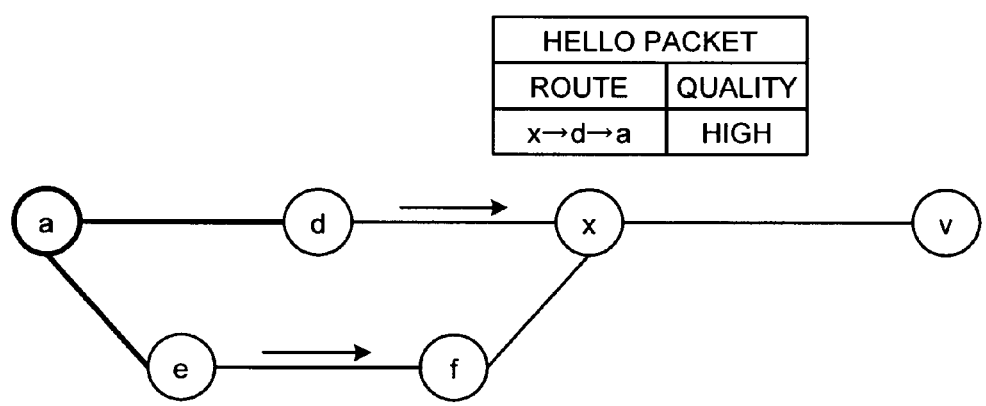
Figure 1C:
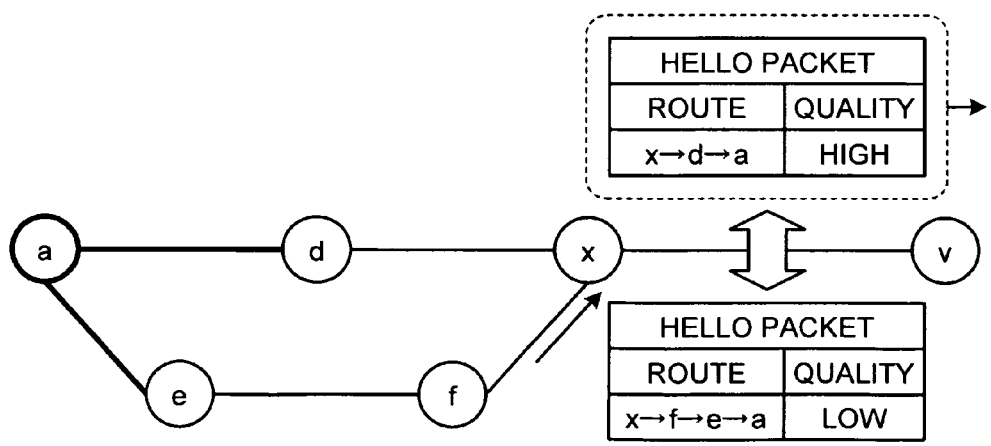

First, the basic principle of the route information relay method according to a first embodiment will be described with reference to FIGS. 1A to 1C. FIGS. 1A to 1C are diagrams for explaining the basic principle of the route information relay method according to the first embodiment. For convenience of explanation, FIGS. 1A to 1C illustrate only a part of the ad hoc network according to the first embodiment.

Each node illustrated in FIGS. 1A to 1C transmits/receives a packet to/from a node other than adjacent nodes interconnected to the node by a multi-hop method. The nodes exchange route information in accordance with a route search protocol. At this time, each node uses a control packet called "HELLO packet". As illustrated in FIGS. 1A to 1C, in the first embodiment, the node "x" is a gateway node, and the node "v" is a node connected to an external network.

First, as illustrated in FIG. 1A, the node "a" newly connects to the ad hoc network, and transmits presence information indicating that the node "a" is present on the network to each of the adjacent node "d" and the adjacent node "e". Here, as illustrated in FIG. 1A, between the node "a" and the node "x", there are a route <node "x" to node "d" to node "a"> and a route <node "x" to node "f" to node "e" to node "a">.

The presence information transmitted from the node "a" is received by the adjacent node "d". Next, the adjacent node "d" generates route information based on the received presence information and relays the generated route information to the adjacent node "x". Then, as illustrated in FIG. 1B, the node "x" receives the route information. The route information indicates a correspondence relationship between a packet destination node and a packet relay node. For example, the route information includes content of <node "x" to node "d" to node "a"> (correspondence relationship between the packet destination node "a" and the packet relay node "d").

Each node according to the first embodiment obtains quality information indicating route quality with respect to the received route information. For example, as illustrated in FIG. 1B, the node "x" obtains quality information "high" indicating the quality of route <node "x" to node "d" to node "a">.

In this situation, a node of a conventional technique transmits the received route information to adjacent nodes every time the node receives the route information. Specifically, a node "x" of a conventional technique transmits the received route information <node "x" to node "d" to node "a"> to the node "v" every time the node "x" receives the route information. However, each node according to the first embodiment does not transmit the received route information to adjacent nodes every time the node receives the route information.

Each node according to the first embodiment determines whether a plurality of route information items whose packet destination nodes are the same are received at a predetermined frequency.

The presence information transmitted from the node "a" is received by the adjacent node "d", and also received by the adjacent node "e". The node "e" generates route information based on the presence information and relays the generated route information to the next adjacent node "f". Then, the node "f" further relays the route information to the next adjacent node "x". Then, as illustrated in FIG. 1C, the node "x" receives the route information. For example, the node "x" receives the route information including content of <node "x" to node "f" to node "e" to node "a"> (correspondence relationship between the packet destination node "a" and the packet relay node "f"). Also, for example, the node "x" obtains quality information "low" indicating the quality of route <node "x" to node "f" to node "e" to node "a">. Therefore, as a result determined at a predetermined frequency, the node "x" determines that a plurality of route information items whose destination nodes are the same are received.

Each node according to the first embodiment compares quality information items of the plurality of received route information items, and as a comparison result, selects a route information item corresponding to a quality information item indicating the highest quality.

For example, the node "x" compares quality information items of the route information <node "x" to node "d" to node "a"> and the route information <node "x" to node "f" to node "e" to node "a">. As a comparison result, the node "x" selects the route information <node "x" to node "d" to node "a"> corresponding to quality information "high" (refer to a dotted line in FIG. 1C).

Each node according to the first embodiment relays the selected route information to nodes that are connected to the node and are other than the transmission source of the route information. For example, as illustrated in FIG. 1C, the node "x" relays the selected route information <node "x" to node "d" to node "a"> to the node "v".

In this way, each node according to the first embodiment can reduce the amount of communication to control the route.

Each node of a conventional technique transmits the received route information to adjacent nodes every time the node receives the route information. As a result, each node has to transmit the route information a plurality of times, and a control header portion is added to each HELLO packet, so that overhead increases because a transmission waiting time is required for each HELLO packet. Further, when the number of transmitted route information items increases, the frequency of collisions increases, and thus the number of retransmissions of the route information increases. Therefore, if a conventional technique is applied to a large scale ad hoc network, a flooding due to excessive packets occurs, and also it is difficult to create a routing table for searching a route.

On the other hand, each node according to the first embodiment does not necessarily transmit the received route information to adjacent nodes every time the node receives the route information. Each node determines whether a plurality of route information items whose packet destination nodes are the same are received at a predetermined frequency, compares quality information items, and selects a route information item corresponding to a quality information item indicating the highest quality. Then, each node relays only the selected route information to adjacent nodes. As a result, each node can reduce the number of transmission times of the route information, and also reduce the overhead. Further, when the number of transmitted route information items decreases, the frequency of collisions decreases, and thus the number of retransmissions of the route information decreases. Therefore, even when the technique of the first embodiment is applied to a large scale ad hoc network, a flooding due to excessive packets does not occur, and it is not difficult to create a routing table for searching a route.

Entire Configuration of Ad Hoc Network and Configuration of Node according to First Embodiment Next, an entire configuration of the ad hoc network and a configuration of a node according to the first embodiment will be described with reference to FIGS. 2 to 15.

Figure 2:
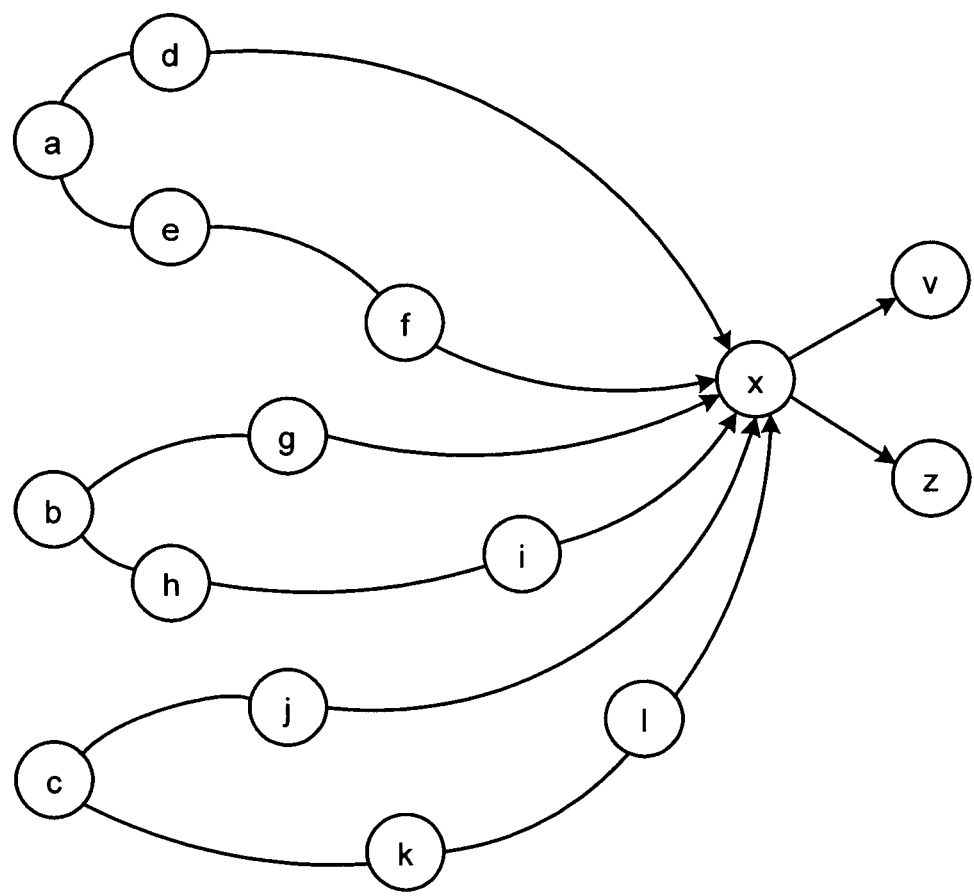
FIG. 2 is a diagram illustrating an entire configuration of an ad hoc network according to the first embodiment.

FIG. 2 is a diagram illustrating the entire configuration of the ad hoc network according to the first embodiment. As illustrated in FIG. 2, in the first embodiment, the node "x" is the gateway node, and the node "v" and the node "z" are nodes connected to an external network. In the first embodiment, it is assumed that the node "a" newly connects to the ad hoc network and transmits presence information indicating that the node "a" is present on the network to each of the adjacent node "d" and the adjacent node "e", and only a portion related to the assumption will be extracted and described.

Figures 3, 4:
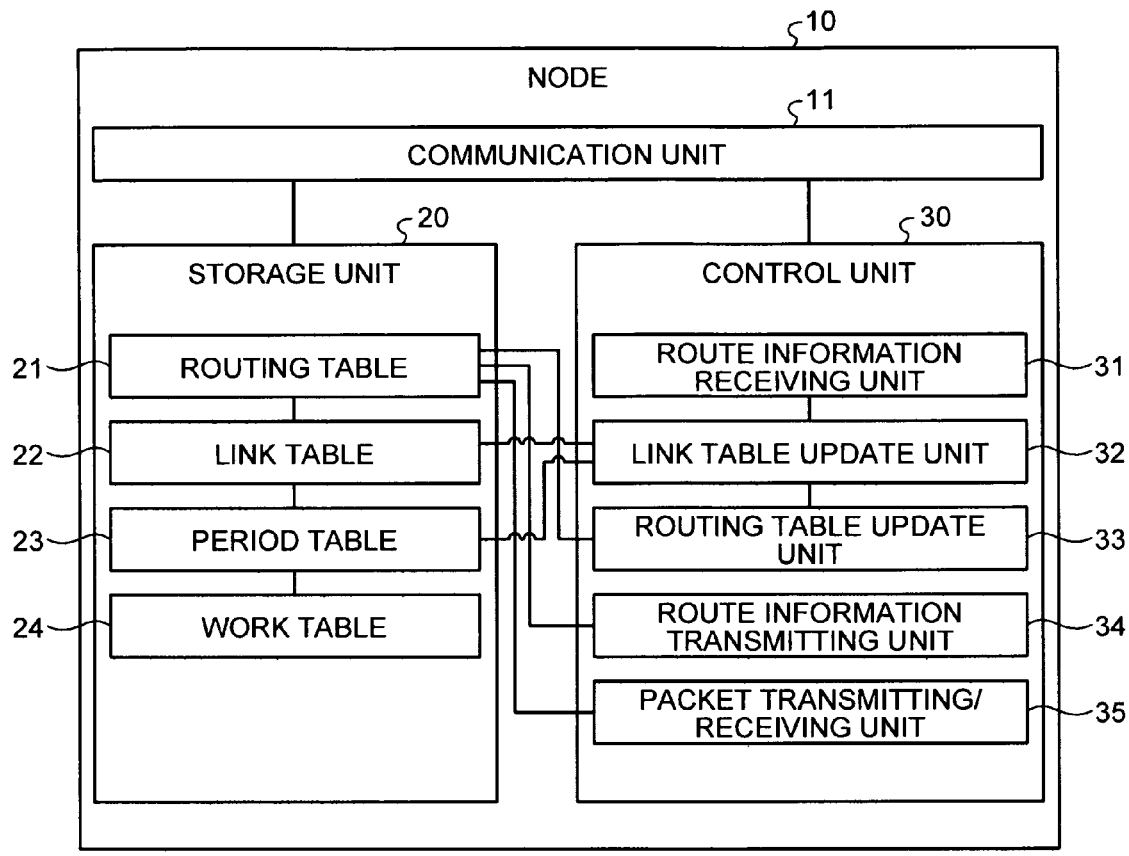
FIG. 3 is a block diagram illustrating a configuration of a node according to the first embodiment.
FIG. 4 is a diagram for explaining a routing table according to the first embodiment.

FIG. 3 is a block diagram illustrating a configuration of a node according to the first embodiment. As illustrated in FIG. 3, a node 10 in the first embodiment includes, in particular, a communication unit 11, a storage unit 20, and a control unit 30. The communication unit 11 includes a wirelessly communicable wireless module, an antenna, and the like.

The storage unit 20 stores data used by the control unit 30 to perform various processing, and includes, in particular, a routing table 21, a link table 22, a period table 23, and a work table 24.

The routing table 21 stores route information. The route information indicates a route to transmit a packet to a destination wireless terminal. In other words, the route information indicates a correspondence relationship between a packet destination node and a packet relay node. The routing table 21 also stores a correspondence relationship between the route information and quality information indicating quality of a route indicated by the route information.

Specifically, if a HELLO packet is received by a route information receiving unit 31 described below, the routing table 21 is updated by a routing table update unit 33 described below, so that the routing table 21 stores the route information. The route information stored by the routing table 21 is used for processing performed by a route information transmitting unit 34 described below and processing by a packet transmitting/receiving unit 35 described below.

For example, the routing table 21 stores route information as illustrated in FIG. 4. FIG. 4 is a diagram for explaining the routing table according to the first embodiment. FIG. 4 illustrates the routing table 21 of the node "x".

The routing table 21 illustrated in FIG. 4 associates a destination node ("destination") that is a destination of a packet with an adjacent node ("adjacent") that is connected to a packet source node and is one of nodes relaying the packet, and stores the associated destination node and adjacent node. The routing table 21 illustrated in FIG. 4 also associates a destination node with an evaluation value ("evaluation value") indicating quality of a route by which a packet is transmitted/received to/from the destination node, and stores the associated destination node and evaluation value. As illustrated in FIG. 4, the evaluation value is a value calculated from a route weight ("route weight") indicating quality of a route between a destination node and an adjacent node, a link weight ("link weight") indicating quality of a link between an adjacent node and the source node, or the like. The calculation method of the evaluation value will be described in detail below in a description of a procedure of routing table update processing.

A specific example will be described. The routing table 21 stores route information of a destination node "d", an adjacent node "d", and an evaluation value "50". That is, when a packet is transmitted to the node "d" as the destination, the routing table 21 stores information indicating that there is a route to transmit the packet in the adjacent node "d" and the quality of the route is the evaluation value "50". The routing table 21 also stores route information of a destination node "e", an adjacent node "f", and an evaluation value "55". That is, when a packet is transmitted to the node "e" as the destination, the routing table 21 stores information indicating that there is a route to transmit the packet in the adjacent node "f" and the quality of the route is the evaluation value "55".

In addition, the routing table 21 illustrated in FIG. 4 also associates a destination node with priority of route information ("priority") and a transmission flag ("transmission flag") indicating whether the route information is transmitted, and stores the associated destination node, priority, and transmission flag. The priority of route information and the transmission flag will be described in detail below in a description of transmission processing.

The link table 22 stores link information. The link information indicates a quality evaluation value of a link between the source node and an adjacent node.

Specifically, if a HELLO packet is received by the route information receiving unit 31 described below, the link table 22 is updated by a link table update unit 32 described below, so that the link table 22 stores the link information. The link information stored by the link table 22 is used for processing performed by the routing table update unit 33 described below.

Figures 5, 6:
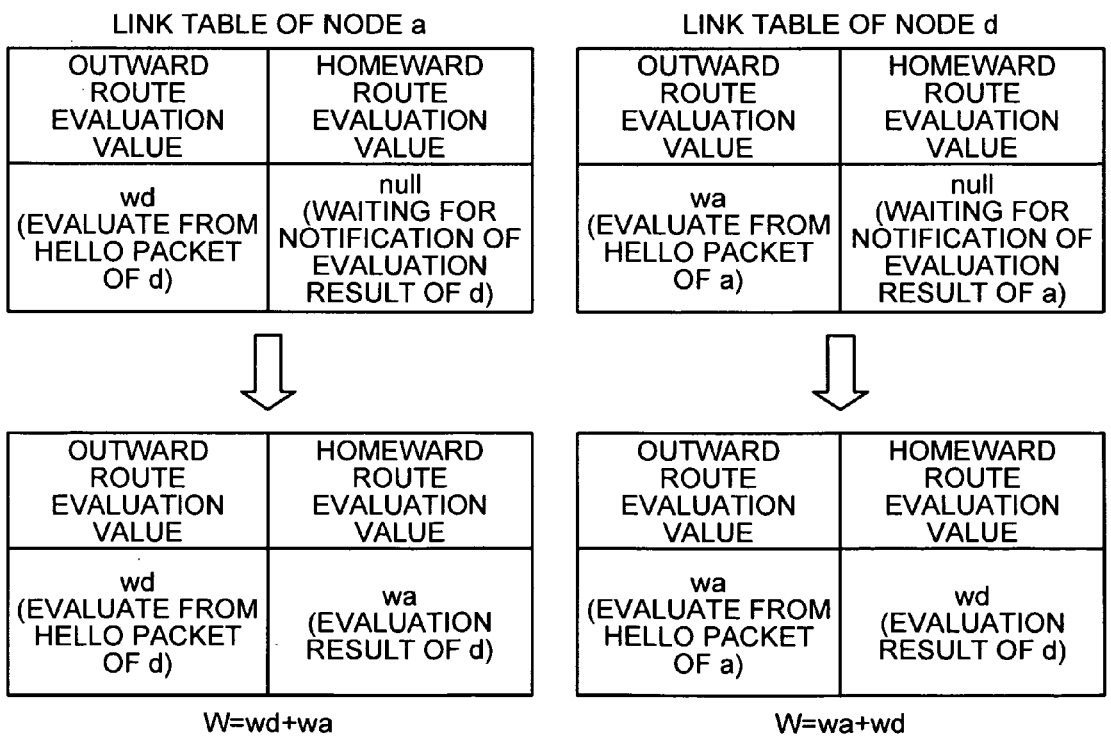
FIG. 5 is a diagram for explaining a link table according to the first embodiment.
FIG. 6 is a diagram for explaining a concept of link weight.

For example, the link table 22 stores link information as illustrated in FIG. 5. FIG. 5 is a diagram for explaining the link table according to the first embodiment. FIG. 5 illustrates the link table 22 of the node "x".

The link table 22 illustrated in FIG. 5 associates an adjacent node ("adjacent"), an outward route evaluation value ("outward route evaluation value") that is a quality evaluation value of the outward route, a homeward route evaluation value ("homeward route evaluation value") that is a quality evaluation value of the homeward route, and a link weight ("link weight") with each other, and stores them. The outward route evaluation value is a quality evaluation value of the outward route as seen from the adjacent node, and the homeward route evaluation value is a quality evaluation value of the homeward route as seen from the adjacent node.

A specific example will be described. The link table 22 stores link information of an adjacent node "d", an outward route evaluation value "30", a homeward route evaluation value "20", and a link weight "50". In other words, the link table 22 stores information indicating that, in the link connected to the adjacent node "d", the outward route quality as seen from the adjacent node "d" is the outward route evaluation value "30" and the homeward route quality as seen from the adjacent node "d" is the homeward route evaluation value "20". The link table 22 also stores information indicating that the link connected to the adjacent node "d" has the link weight "50".

Here, concepts of the outward route evaluation value, the homeward route evaluation value, and the link weight will be described with reference to FIG. 6. FIG. 6 is a diagram for explaining the concept of the link weight. Every time each node 10 according to the first embodiment transmits/receives a HELLO packet to/from an adjacent node, the node 10 evaluates quality of the link between the node 10 and the adjacent node, and stores the quality in the link table 22 as the latest information.

The link between the node "a" and the node "d" will be described as an example. First, as illustrated in FIG. 6, the node "a" evaluates the quality of the outward route as seen from the node "d" by evaluating the HELLO packet received from the node "d", and calculates an outward route evaluation value "wd". On the other hand, the node "a" cannot evaluate the quality of the homeward route as seen from the node "d". Therefore, as illustrated in FIG. 6, in the link table of the node "a", only the outward route evaluation value "wd" is stored, and the homeward route evaluation value is "null" (no information is stored).

Similarly, the node "d" evaluates the quality of the outward route as seen from the node "a" by evaluating the HELLO packet received from the node "a", and calculates an outward route evaluation value "wa". On the other hand, the node "d" cannot evaluate the quality of the homeward route as seen from the node "a". Therefore, as illustrated in FIG. 6, in the link table of the node "d", only the outward route evaluation value "wa" is stored, and the homeward route evaluation value is "null".

Here, as illustrated in FIG. 6, the outward route as seen from the node "d" is the homeward route as seen from the node "a", and the outward route as seen from the node "a" is the homeward route as seen from the node "d". Therefore, the outward route evaluation value "wd" calculated by the node "a" is a value that should be stored in the link table of the node "d" as the homeward route evaluation value, and the outward route evaluation value "wa" calculated by the node "d" is a value that should be stored in the link table of the node "a" as the homeward route evaluation value. Therefore, when transmitting the HELLO packet, the node "a" notifies the node "d" of the outward route evaluation value "wd", and the node "d" notifies the node "a" of the outward route evaluation value "wa".

Then, as illustrated in FIG. 6, in the link table of the node "a", the homeward route evaluation value of "wa" is stored in addition to the outward route evaluation value "wd", and in the link table of the node "d", the homeward route evaluation value of "wd" is stored in addition to the outward route evaluation value "wa". In the first embodiment, the link weight indicating the quality of the link is a value in which the outward route evaluation value and the homeward route evaluation value are added together. Therefore, as illustrated in FIG. 6, the link weight "W" of the node "a" is "wd+wa" and the link weight "W" of the node "d" is "wa+wd".

In FIG. 6, it is described that the exchange of the outward route evaluation value and the homeward route evaluation value between the node "a" and the node "d" are performed at the same time. However, as described above, every time each node 10 according to the first embodiment transmits/receives a HELLO packet to/from an adjacent node, the node 10 evaluates the quality of the link between the node 10 and the adjacent node, and stores the quality in the link table 22 as the latest information. Therefore, the exchange of the outward route evaluation value and the homeward route evaluation value are not necessarily performed at the same time. There may be a case in which only the outward route evaluation value is stored in the link table 22 as the latest information, and the link weight is updated on the basis of the latest outward route evaluation value, but the homeward route evaluation value is not the latest information.

The period table 23 stores period information. The period information indicates periods between packets received from an adjacent node. Specifically, if a HELLO packet is received by the route information receiving unit 31 described below, the period table 23 is updated by the link table update unit 32 described below, so that the period table 23 stores the period information. The period information stored by the period table 23 is used for processing performed by the link table update unit 32.

For example, the period table 23 stores period information as illustrated in FIG. 7. FIG. 7 is a diagram for explaining the period table according to the first embodiment. FIG. 7 illustrates the period table 23 of the node "x".

The period table 23 illustrated in FIG. 7 associates an ID ("ID") for identifying a packet, a period ("period") between received packets, and a time ("reception time") when the packet is received with each other for each adjacent node that is the transmission source of the received packet, and stores them.

A specific example will be described. The period table 23 stores period information of an ID "4", a period "0:02", and a reception time "0:05" for a packet received from the adjacent node "d". In other words, the period table 23 stores information indicating that the packet of the ID "4" is a packet received at the time "0:05" and the period is "0:02" which is a difference between the time "0:05" and the reception time of a packet of ID "3" ("0:05"-"0:03").

The work table 24 has the same structure as that of the routing table 21, and temporarily stores undetermined route information before storing into the routing table 21. The work table 24 will be described in detail below in a description of link table update processing.

The control unit 30 controls the node 10 to perform various processing, and includes, in particular, a route information receiving unit 31, a link table update unit 32, a routing table update unit 33, a route information transmitting unit 34, and a packet transmitting/receiving unit 35. The control unit 30 is performed on a memory included in the node 10.

The route information receiving unit 31 receives route information from an adjacent node. Specifically, the route information receiving unit 31 receives a HELLO packet from an adjacent node. The route information receiving unit 31 transfers the received HELLO packet to the link table update unit 32 and the routing table update unit 33.

The link table update unit 32 updates the link information stored in the link table 22. Specifically, when a HELLO packet is transferred from the route information receiving unit 31 to the link table update unit 32, the link table update unit 32 updates the link information stored in the link table 22 on the basis of the transferred HELLO packet. When updating the link information, the link table update unit 32 updates the period information stored in the period table 23, and updates the link information on the basis of the updated period information. The processing performed by the link table update unit 32 will be described in detail below in a description of link table update processing.

The routing table update unit 33 updates the route information stored in the routing table 21. Specifically, when a HELLO packet is transferred from the route information receiving unit 31 to the routing table update unit 33, the routing table update unit 33 updates the route information stored in the routing table 21 on the basis of the transferred HELLO packet. The processing performed by the routing table update unit 33 will be described in detail below in a description of routing table update processing.

The route information transmitting unit 34 transmits the route information to adjacent nodes other than the node that transmits the route information. Specifically, the route information transmitting unit 34 generates a HELLO packet from the route information stored in the routing table 21 updated by the routing table update unit 33, and transmits the generated HELLO packet to adjacent nodes. The processing performed by the route information transmitting unit 34 will be described in detail below in a description of route information transmission processing.

The packet transmitting/receiving unit 35 receives a packet from an adjacent node. Specifically, when the packet transmitting/receiving unit 35 receives a packet from an adjacent node, the packet transmitting/receiving unit 35 determines the destination of the received packet. The packet transmitting/receiving unit 35 transmits a packet to adjacent nodes. Specifically, the packet transmitting/receiving unit 35 transmits the transferred packet on the basis of the route information stored in the routing table 21.

Processing Procedure of Node According to First Embodiment

Figure 8:
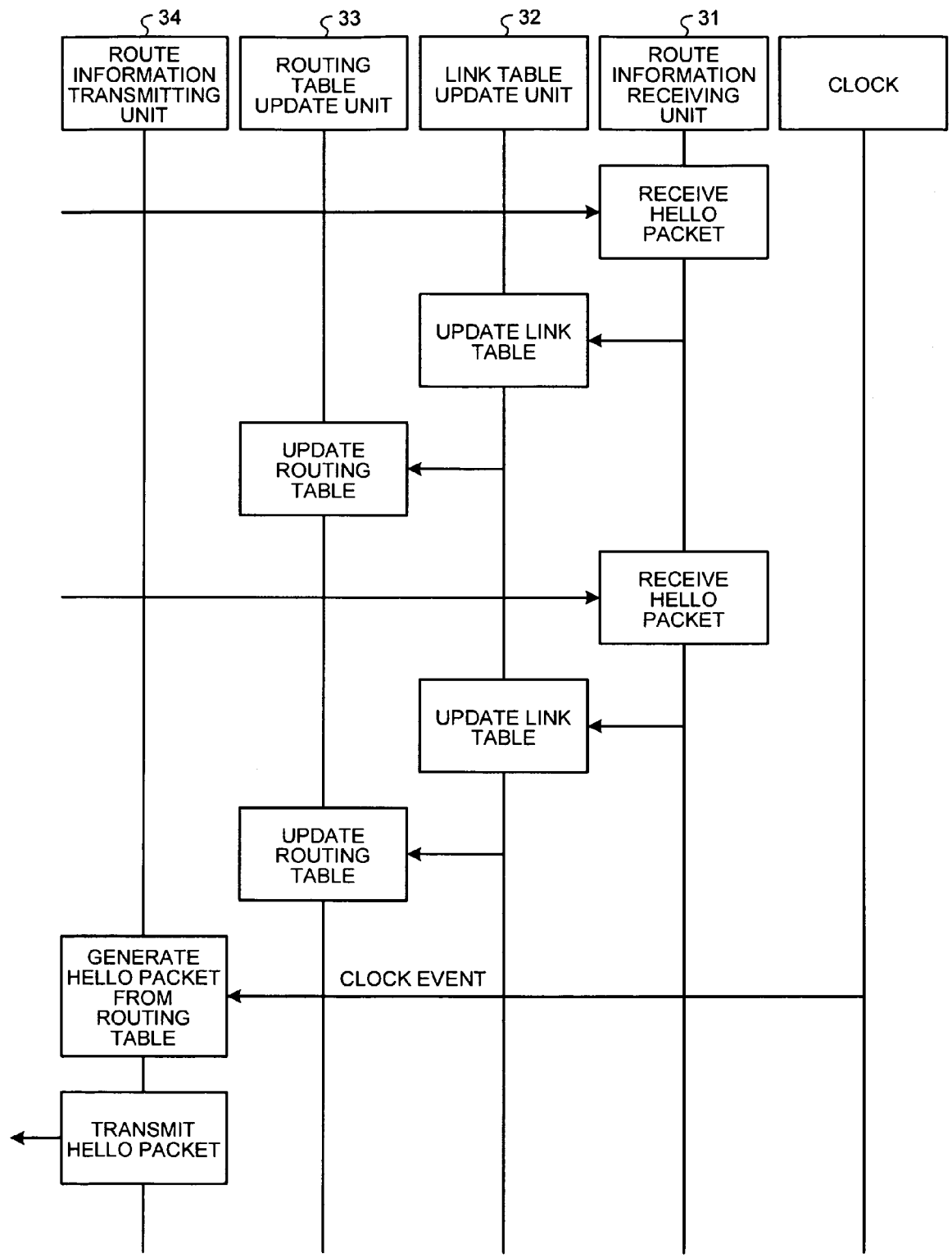
FIG. 8 is a diagram for explaining a processing procedure (as a whole) of a node according to the first embodiment.

Next, a processing procedure of a node according to the first embodiment will be described with reference to FIGS. 8 to 19. First, the processing procedure (as a whole) of a node according to the first embodiment will be described with reference to FIG. 8. FIG. 8 is a diagram for explaining the processing procedure (as a whole) of a node according to the first embodiment. FIG. 8 illustrates the route information receiving unit 31, the link table update unit 32, the routing table update unit 33, the route information transmitting unit 34, and a clock by selecting from components included in the node 10 according to the first embodiment.

As illustrated in FIG. 8, the node 10 according to the first embodiment receives a HELLO packet at the route information receiving unit 31. When the HELLO packet is received at the route information receiving unit 31, as illustrated in FIG. 8, the link table update unit 32 updates the link table, and the routing table update unit 33 updates the routing table. In other words, when a HELLO packet is received, the update of the link table and the update of the routing table are performed subsequently.

The node 10 receives a HELLO packet from an adjacent node, and the receiving timing of the HELLO packet is not controlled by the node 10. Therefore, as illustrated in FIG. 8, when the node 10 according to the first embodiment receives a HELLO packet again at the route information receiving unit 31, the link table update unit 32 updates the link table, and the routing table update unit 33 updates the routing table.

The node 10 according to the first embodiment includes a clock to measure a predetermined period, and for every predetermined period measured by the clock (for every clock event), the route information transmitting unit 34 generates a HELLO packet from the route information stored in the routing table 21, and transmits the HELLO packet.

Figure 9:
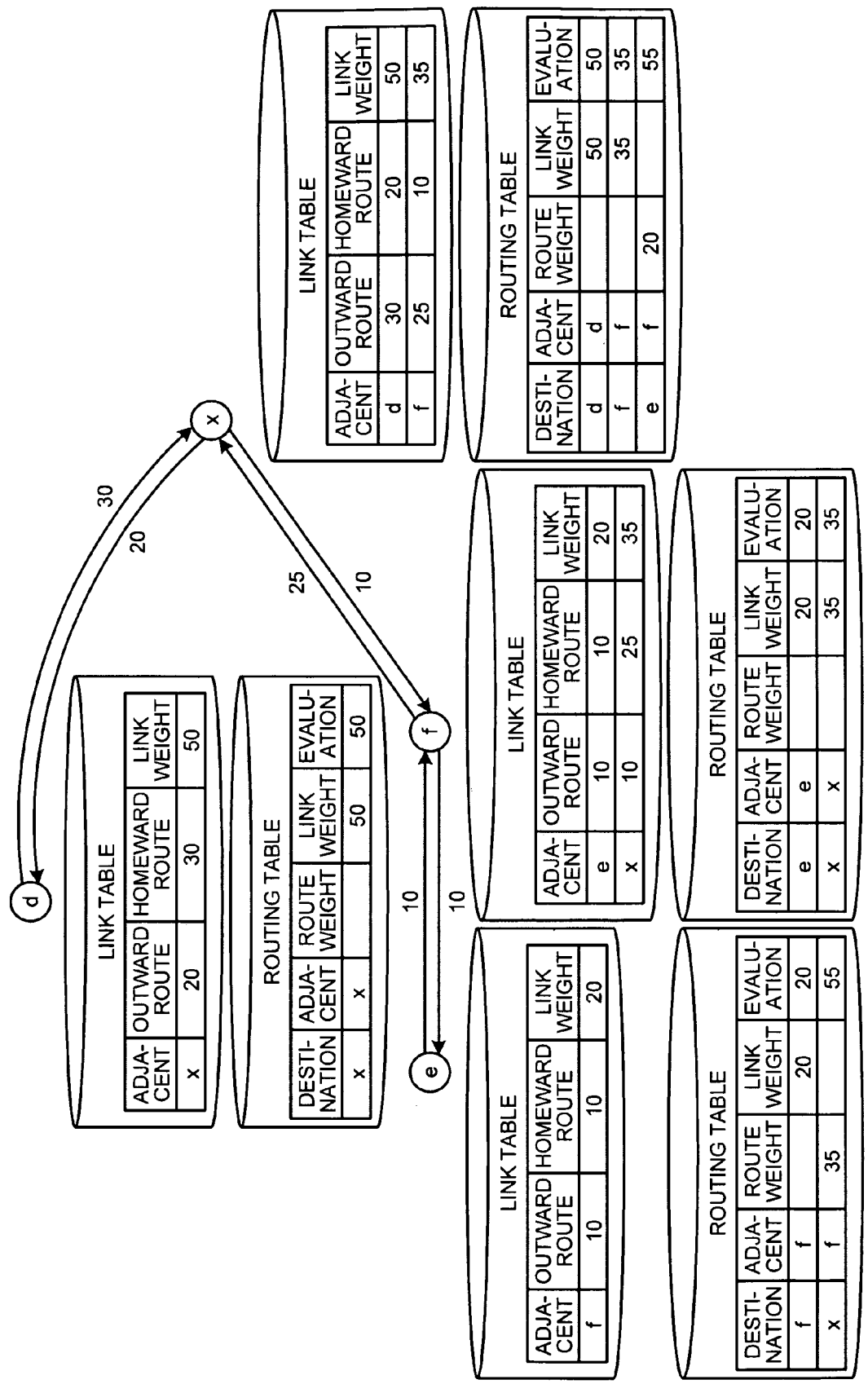
FIG. 9 is a diagram for explaining a table update example according to the first embodiment.
Figure 10:
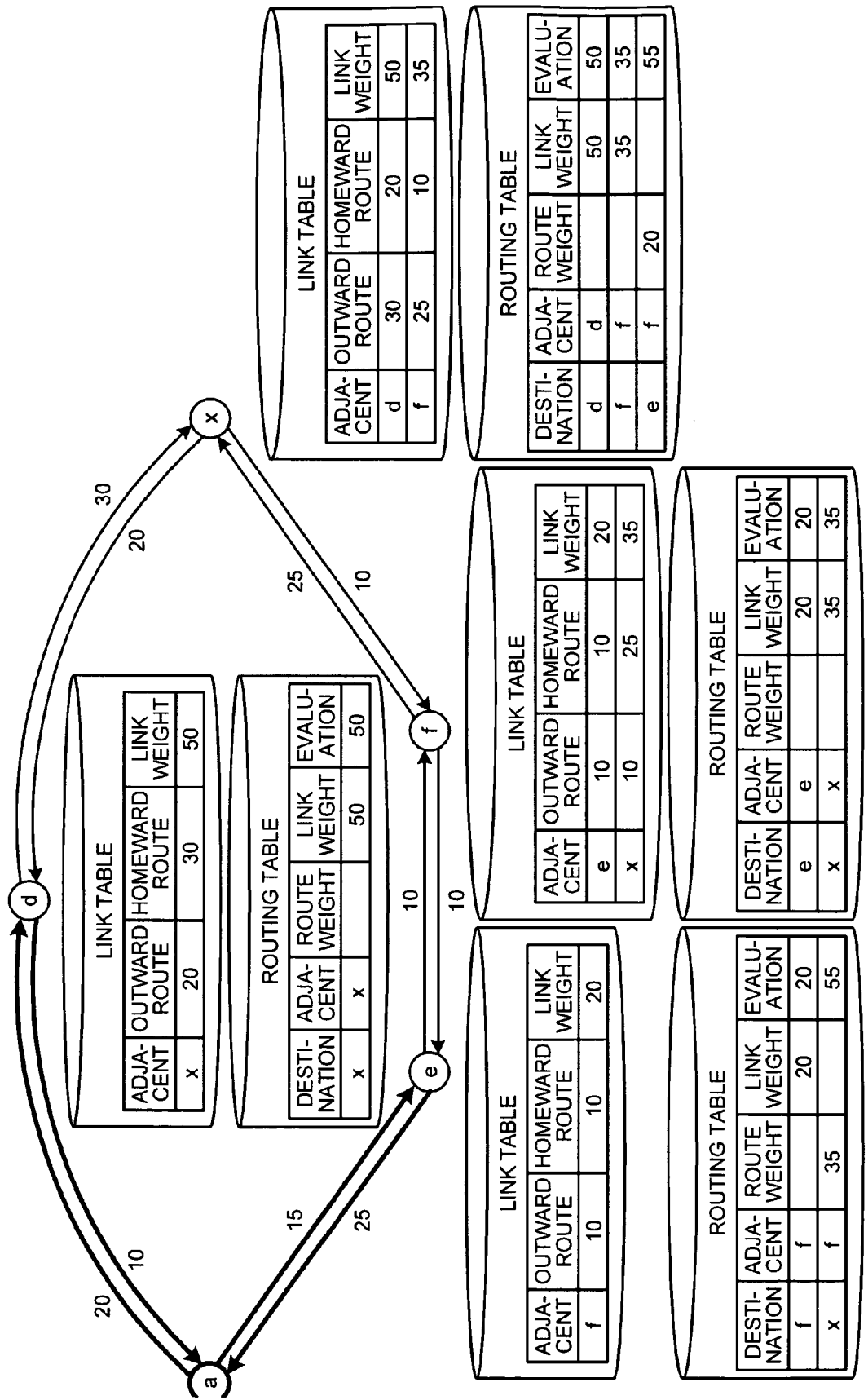
FIG. 10 is a diagram for explaining a table update example according to the first embodiment.

Next, a general operation of a table update example according to the first embodiment will be described with reference to FIGS. 9 and 10. FIGS. 9 and 10 are diagrams for explaining the table update example according to the first embodiment. In the description below, with respect to the entire configuration of the ad hoc network illustrated in FIG. 2, only the route information and the link information transmitted/received within a part of the network constituted by the node "a", the node "d", the node "e", the node "f", and the node "x" will be illustrated. Although, actually, the route information and the link information related to all the nodes included in the entire configuration of the ad hoc network illustrated in FIG. 2 are held and transmitted/received by each node, in the description below, only a part of the route information and the link information will be illustrated for convenience of description.

As illustrated in FIG. 9, in the first embodiment, the node "x" is the gateway node. It is assumed that the qualities of the link between the node "d" and the node "x", the link between the node "e" and the node "f", and the link between the node "f" and the node "x" are represented by the values illustrated in FIG. 9. The link tables and the routing tables illustrated in FIG. 9 illustrate values when it is assumed that the qualities of the links are represented by the values illustrated in FIG. 9. In FIG. 9, "adjacent" indicates the adjacent node, "outward route" indicates the outward route evaluation value, and "homeward route" indicates the homeward route evaluation value. Also, in FIG. 9, "destination" indicates the destination node, "adjacent" indicates the adjacent node, and "evaluation" indicates the evaluation value.

First, the node "d" will be described. The node "d" stores the node "x" as an adjacent node in the link table. The node "d" also stores "20" as the outward route evaluation value and "30" as the homeward route evaluation value in the link table. At this time, the outward route evaluation value is a quality evaluation value of the outward route as seen from the node "x", and the homeward route evaluation value is a quality evaluation value of the homeward route as seen from the node "x". In the first embodiment, the link weight represents a value in which the outward route evaluation value and the homeward route evaluation value are added together. Therefore, as illustrated in FIG. 9, the node "d" stores "50" in the link table as the link weight.

Next, the node "d" stores the node "x" as a destination node and stores the node "x" as an adjacent node in the routing table. That is, when the node "d" transmits a packet to the node "x" as the destination, the node "d" stores route information indicating that there is a route to transmit the packet in the adjacent node "x". At this time, the destination node "x" is an adjacent node of the node "d". Therefore, the node "d" does not store the route weight in the routing table, and stores the link weight "50" obtained from the link table in the routing table. The node "d" stores the evaluation value "50" assuming that the link weight itself is the evaluation value of the route between the node "d" and the node "x".

Next, the node "e" will be described. The node "e" stores the node "f" as an adjacent node in the link table. The node "e" also stores "10" as the outward route evaluation value and "10" as the homeward route evaluation value in the link table. The node "e" also stores "20" as the link weight in the link table.

Next, the node "e" stores the node "f" as a destination node and stores the node "f" as an adjacent node in the routing table. The node "e" also stores the node "x" as a destination node and stores the node "f" as an adjacent node. That is, when the node "e" transmits a packet to the node "f" as the destination, the node "e" stores route information indicating that there is a route to transmit the packet in the adjacent node "f". When the node "e" transmits a packet to the node "x" as the destination, the node "e" stores route information indicating that there is a route to transmit the packet in the adjacent node "f".

Here, the route information when the packet is transmitted to the node "x" as the destination will be described. The route weight is a value indicating the quality of the route between the destination node and the adjacent node. Specifically, as illustrated in FIG. 9, the route weight corresponds to the value indicating the quality of the route between the destination node "x" and the adjacent node "f". Given this situation, the route weight is "35". The evaluation value is a value indicating the quality of the route through which a packet is transmitted/received between the source node and the destination node. Specifically, as illustrated in FIG. 9, the evaluation value is a value obtained by adding the value indicating the quality of the route between the adjacent node "f" and the source node "e" to the value indicating the quality of the route between the destination node "x" and the adjacent node "f". Given this situation, the evaluation value is "55".

Similarly, the node "f" and the node "x" also store the link table and the routing table.

In the first embodiment, it is assumed that, as illustrated in FIG. 10, the node "a" is newly connected to the ad hoc network illustrated in FIG. 9. It is assumed that the quality of the link between the node "a" and the node "d", and the quality of the link between the node "a" and the node "e" have the values illustrated in FIG. 10. When the node "a" is newly connected to the ad hoc network, each of the node "d", the node "e", the node "f", and the node "x" according to the first embodiment transmits/receives the route information, and updates the link table and the routing table. In the description below, on the assumption that the values illustrated in FIGS. 9 and 10 are used, a specific example of processing performed by each of the node "d", the node "e", the node "f", and the node "x" will be described with reference to FIGS. 11 to 15. FIGS. 11 to 15 are diagrams for explaining table update examples according to the first embodiment.

As described above, it is assumed that the node "a" is newly connected to the ad hoc network according to the first embodiment. At this time, the node "a" transmits presence information indicating that the node "a" is present on the network to each of the adjacent node "d" and the adjacent node "e".

Figure 11:
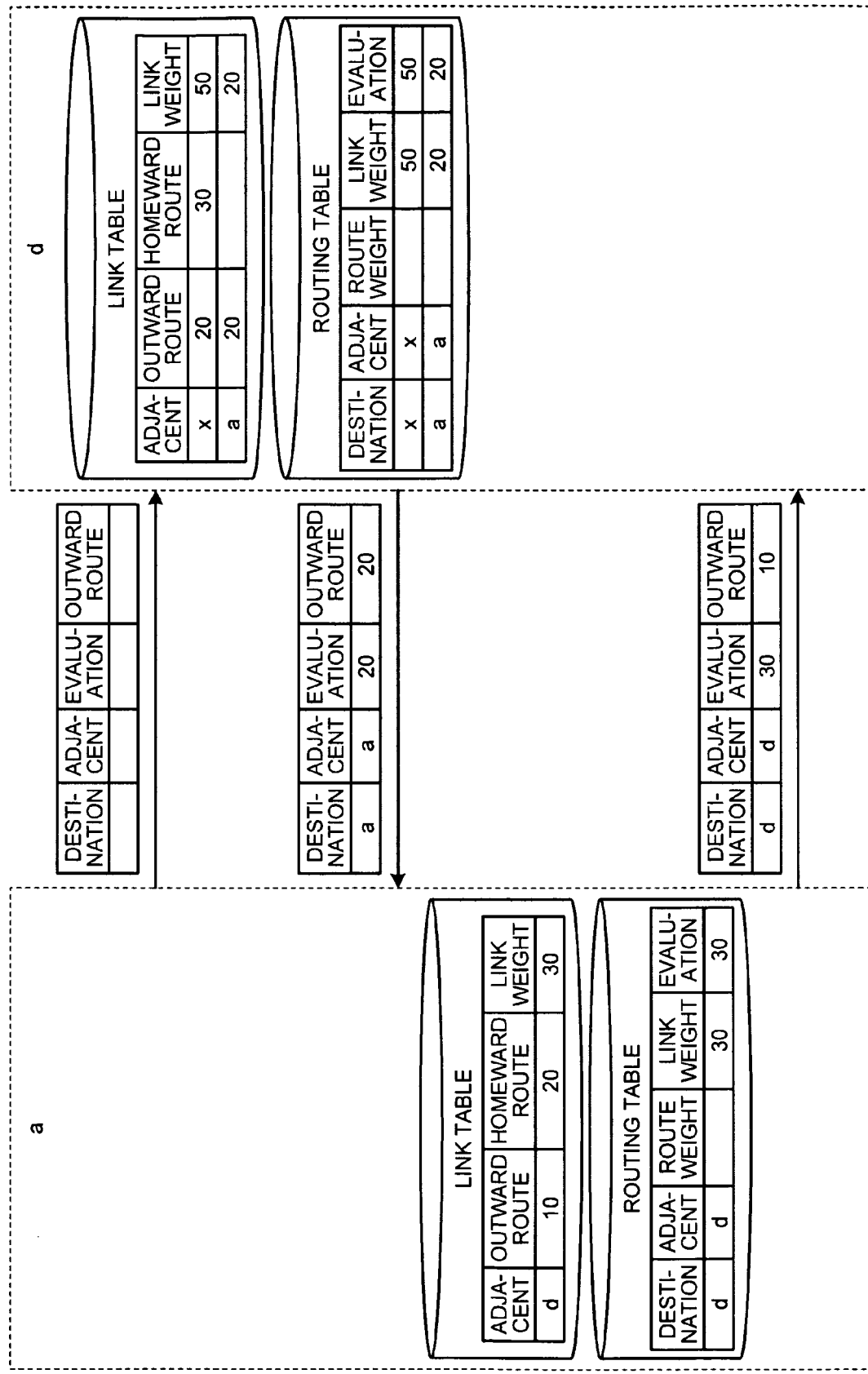
FIG. 11 is a diagram for explaining a table update example according to the first embodiment.
Figure 12:
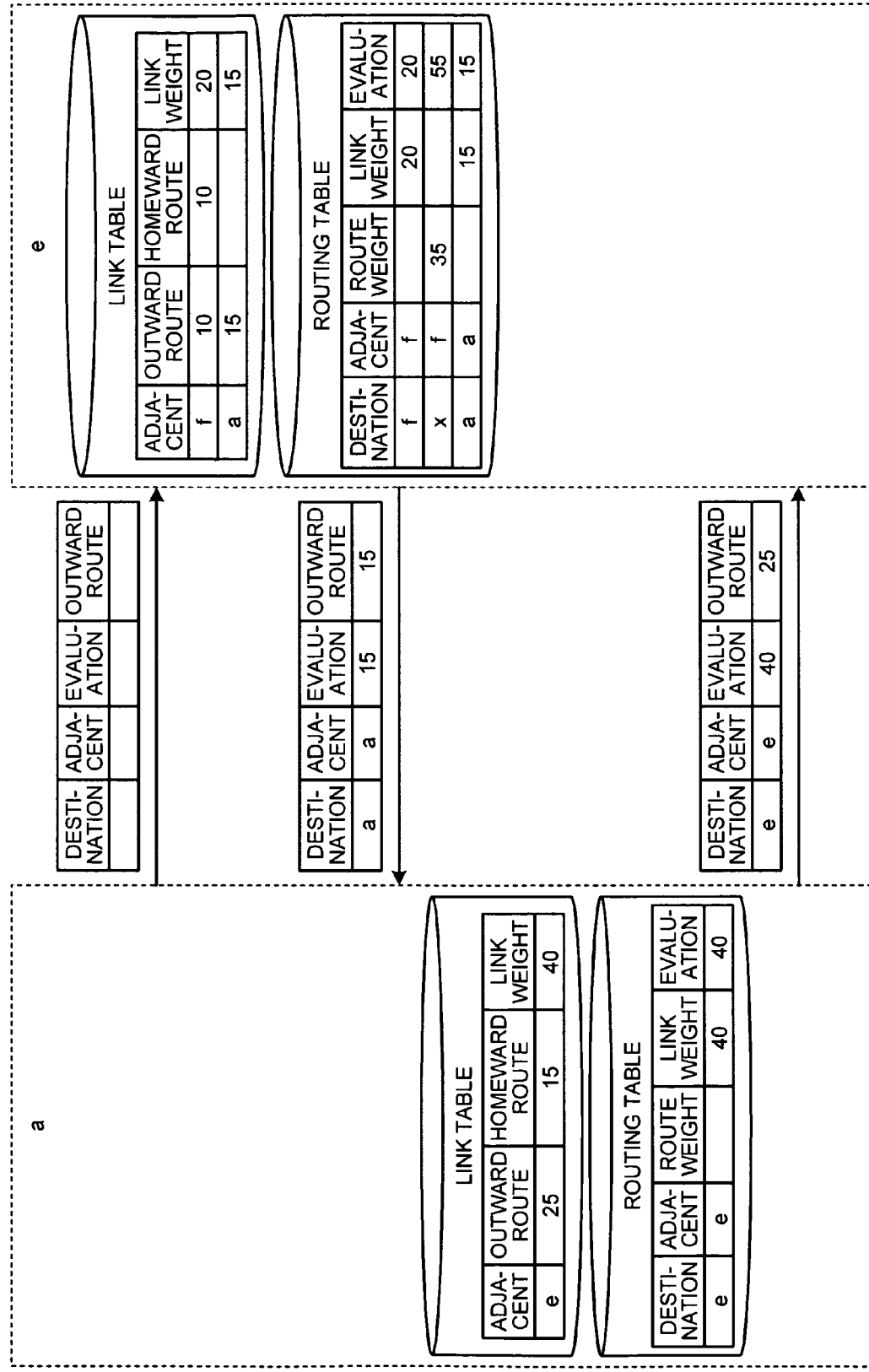
FIG. 12 is a diagram for explaining a table update example according to the first embodiment.

First, as illustrated in FIGS. 11 and 12, the node "a" broadcasts an empty HELLO packet to the node "d" and the node "e". When the node "d" receives the HELLO packet, first, the node "d" performs the link table update processing. Specifically, the node "d" identifies the transmission source node of the HELLO packet. The transmission source node is the node "a". Next, the node "d" newly creates a period table of the transmission source node "a", calculates the standard deviation of the periods, and thus calculates the outward route evaluation value "20". Then, as illustrated in FIG. 11, the node "d" newly creates a record of the node "a" in the link table, associates the outward route evaluation value "20" with the node "a", and stores the outward route evaluation value "20" associated with the node "a" in the record. Then, the node "d" determines whether the outward route evaluation value is included in the HELLO packet. Since the HELLO packet is empty, the node "d" determines that the outward route evaluation value is not included in the HELLO packet. As illustrated in FIG. 11, the node "d" directly sets the outward route evaluation value "20" obtained by evaluating the empty HELLO packet in the link table as the link weight "20".

Next, the node "d" performs the routing table update processing. Specifically, the node "d" identifies the transmission source node of the HELLO packet. The transmission source node is the node "a". Next, the node "d" newly creates a record of the node "a" in a work table having the same structure as that of the routing table. The node "d" sets the transmission source node "a" in the destination node of the work table, and sets the transmission source node "a" in the adjacent node of the work table. Then, the node "d" searches the link table by using the transmission source node "a", and obtains the link weight "20" that is associated with the node "a" and stored. Next, the node "d" stores the obtained link weight "20" in the record of the destination node "a" and the adjacent node "a" in the work table as the link weight "20". Then, the node "d" determines whether there is the same record in the routing table, and when there is not the same record, as illustrated in FIG. 10, the node "d" newly adds the record created in the work table to the routing table.

Next, the node "d" determines whether information is included in the HELLO packet. Since the HELLO packet is empty, the node "d" determines that information is not included in the HELLO packet, and the node "d" calculates an evaluation value and stores the evaluation value in the routing table. Specifically, the node "d" stores the link weight "20" as the evaluation value "20" because the destination node "a" is an adjacent node.

It is assumed that the clock measures a predetermined period and a clock event occurs in the node "d". Then, the node "d" transmits a HELLO packet (the node "d" may transmits a HELLO packet in real time when the node "d" receives the empty HELLO packet from the node "a"). The node "d" creates the HELLO packet from the routing table and transmits the HELLO packet to each of the adjacent node "a" and the adjacent node "x". In the description of FIG. 11, for convenience of description, it is assumed that the node "d" transmits a HELLO packet including only the route information related to the node "a" to only the node "a".

The node "d" searches the routing table and sorts records of the destination node "a" into a group. Since there is one record of the destination node "a", the node "d" adds the record of the destination node "a" to the HELLO packet and transmits the HELLO packet to the adjacent node "a". Specifically, as illustrated in FIG. 11, the node "d" obtains route information indicating that the destination node is "a", the adjacent node is "a", and the evaluation value is "20" from the routing table, and creates the HELLO packet. Also, as illustrated in FIG. 11, the node "d" obtains link information indicating that the outward route evaluation value is "20" from the link table, and creates the HELLO packet. These evaluation value and outward route evaluation value are the latest values obtained by evaluating the HELLO packet received from the node "a".

On the other hand, when the node "a" receives the HELLO packet, first, the node "a" performs the link table update processing. Specifically, the node "a" identifies the transmission source node of the HELLO packet. The transmission source node is the node "d". Next, the node "a" newly creates a period table of the transmission source node "d", calculates the standard deviation of the periods, and thus calculates the outward route evaluation value "10". Then, as illustrated in FIG. 11, the node "a" newly creates a record of the node "d" in the link table, associates the outward route evaluation value "10" with the node "d", and stores the outward route evaluation value "10" associated with the node "d" in the record. Then, the node "a" determines whether the outward route evaluation value is included in the HELLO packet. Since the outward route evaluation value "20" is included in the HELLO packet, the node "a" determines that the outward route evaluation value is included in the HELLO packet. Then, as illustrated in FIG. 11, the node "a" associates the outward route evaluation value "20" included in the received HELLO packet with the transmission source node "d" in the link table, and stores the value as the homeward route evaluation value "20". Further, the node "a" calculates the link weight "30" by adding together the outward route evaluation value "10" and the homeward route evaluation value "20", and sets the link weight "30" in the link table.

Next, the node "a" performs the routing table update processing. Specifically, the node "a" identifies the transmission source node of the HELLO packet. The transmission source node is the node "d". Next, the node "a" newly creates a record of the node "d" in a work table having the same structure as that of the routing table. The node "a" sets the transmission source node "d" in the destination node of the work table, and sets the transmission source node "d" in the adjacent node of the work table. Then, the node "a" searches the link table by using the transmission source node "d", and obtains the link weight "30" that is associated with the node "d" and stored. Next, the node "a" stores the obtained link weight "30" in the record of the destination node "d" and the adjacent node "d" in the work table as the link weight "30". Then, the node "a" determines whether there is the same record in the routing table, and when there is not the same record, as illustrated in FIG. 11, the node "a" newly adds the record created in the work table to the routing table.

Next, the node "a" determines whether information is included in the HELLO packet, and determines that information is included. The node "a" determines whether the destination node or the adjacent node is the node "a", and determines that the destination node or the adjacent node is the node "a". Next, the node "a" determines whether untreated information is included in the received packet, and determines that untreated information is not included. Thereafter, the node "a" calculates an evaluation value and stores the evaluation value in the routing table. Specifically, the node "a" stores the link weight "30" as the evaluation value "30" because the destination node "d" is an adjacent node.

It is assumed that the clock measures a predetermined period and a clock event occurs in the node "a". Then, the node "a" transmits a HELLO packet. The node "a" creates the HELLO packet from the routing table and transmits the HELLO packet to the adjacent node "d". The node "a" searches the routing table and sorts records of the destination node "d" into a group. Since there is one record of the destination node "d", the node "a" adds the record of the destination node "d" to the HELLO packet and transmits the HELLO packet to the adjacent node "d". Specifically, as illustrated in FIG. 11, the node "a" obtains route information indicating that the destination node is "d", the adjacent node is "d", and the evaluation value is "30" from the routing table, and creates the HELLO packet. Also, as illustrated in FIG. 11, the node "a" obtains link information indicating that the outward route evaluation value is "10" from the link table, and creates the HELLO packet. These evaluation value and outward route evaluation value are the latest values obtained by evaluating the HELLO packet received from the node "d".

The node "a" broadcasts an empty HELLO packet to the node "e" in addition to the node "d". FIG. 12 illustrates HELLO packet transmission/reception performed between the node "a" and the node "e", and updates of the link tables and the routing tables.

Figure 13:
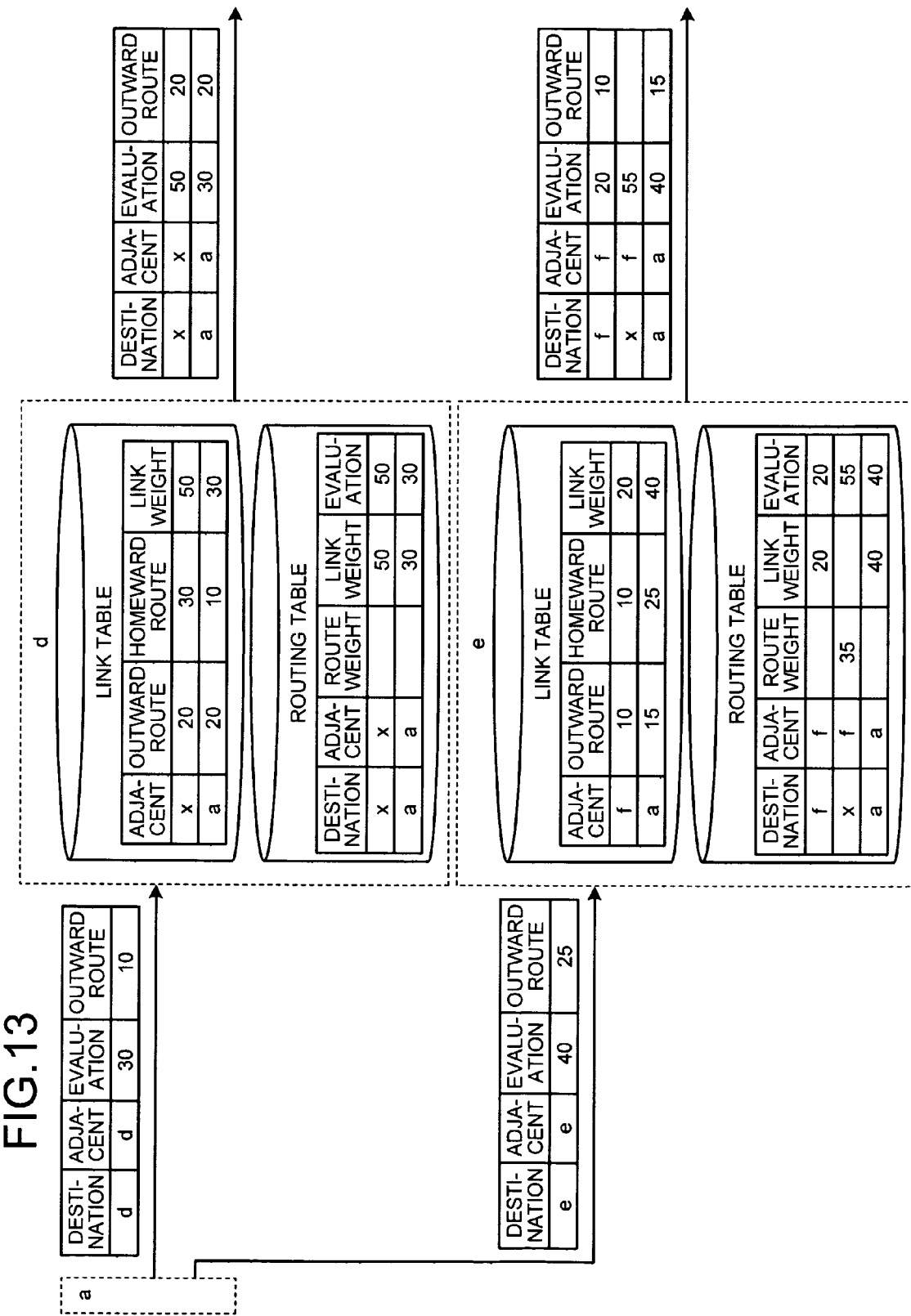
FIG. 13 is a diagram for explaining a table update example according to the first embodiment.

Next, HELLO packet transmission/reception and updates of the link tables and the routing tables performed following the operation of FIGS. 11 and 12 will be described with reference to FIGS. 13 to 15. First, as illustrated in FIG. 13, the node "a" transmits a HELLO packet to each of the node "d" and the node "e". These HELLO packets are the same as the HELLO packets illustrated in FIGS. 11 and 12 (the third HELLO packets).

When the node "d" receives the HELLO packet, first, the node "d" performs the link table update processing. Specifically, the node "d" identifies the transmission source node of the HELLO packet. The transmission source node is the node "a". Next, the node "d" newly creates a record in the uppermost row of the period table of the transmission source node "a", calculates the standard deviation of the periods, and thus calculates the outward route evaluation value "20". Although the value is not changed, the value is the latest value. Then, as illustrated in FIG. 13, the node "d" identifies the existing record of the node "a" in the link table, associates the outward route evaluation value "20" with the node "a", and overwrites the outward route evaluation value "20" in the record. Then, the node "d" determines whether the outward route evaluation value is included in the HELLO packet. Since the outward route evaluation value "10" is included in the HELLO packet, the node "d" determines that the outward route evaluation value is included in the HELLO packet. Then, as illustrated in FIG. 13, the node "d" associates the outward route evaluation value "10" included in the received HELLO packet with the transmission source node "a" in the link table, and stores the value as the homeward route evaluation value "10". Further, the node "d" calculates the link weight "30" by adding together the outward route evaluation value "20" and the homeward route evaluation value "10", and sets the link weight "30" in the link table.

Next, the node "d" performs the routing table update processing. Specifically, the node "d" identifies the transmission source node of the HELLO packet. The transmission source node is the node "a". Next, the node "d" newly creates a record of the node "a" in a work table having the same structure as that of the routing table. The node "d" sets the transmission source node "a" in the destination node of the work table, and sets the transmission source node "a" in the adjacent node of the work table. Then, the node "d" searches the link table by using the transmission source node "a", and obtains the link weight "30" that is associated with the node "a" and stored. Next, the node "d" stores the obtained link weight "30" in the record of the destination node "a" and the adjacent node "a" in the work table as the link weight "30". Then, the node "d" determines whether there is the same record in the routing table, and when there is the same record, as illustrated in FIG. 13, the node "d" overwrites the record created in the work table on the routing table.

Next, the node "d" determines whether information is included in the HELLO packet, and determines that information is included. The node "d" determines whether the destination node or the adjacent node is the node "d", and determines that the destination node or the adjacent node is the node "d". Next, the node "d" determines whether untreated information is included in the received packet, and determines that untreated information is not included. Thereafter, the node "d" calculates an evaluation value and stores the evaluation value in the routing table. Specifically, the node "d" stores the link weight "30" as the evaluation value "30" because the destination node "a" is an adjacent node.

It is assumed that the clock measures a predetermined period and a clock event occurs in the node "d". Then, the node "d" transmits a HELLO packet. The node "d" creates the HELLO packet from the routing table and transmits the HELLO packet to each of the adjacent node "a" and the adjacent node "x". In the description of FIG. 13, for convenience of description, it is assumed that the node "d" transmits the HELLO packet to only the node "x".

The node "d" searches the routing table and sorts records of the destination node "x" and the destination node "a" into groups respectively. Since there are one record of the destination node "x" and one record of the destination node "a", the node "d" adds the record of the destination node "x" and the record of the destination node "a" to the HELLO packet and transmits the HELLO packet to the adjacent node "x". Specifically, as illustrated in FIG. 13, the node "d" obtains route information indicating that the destination node is "x", the adjacent node is "x", and the evaluation value is "50" from the routing table, and creates the HELLO packet. Also, as illustrated in FIG. 13, the node "d" obtains link information indicating that the outward route evaluation value is "20" from the link table, and creates the HELLO packet. The node "d" obtains route information indicating that the destination node is "a", the adjacent node is "a", and the evaluation value is "30" from the routing table, and creates the HELLO packet. Also, as illustrated in FIG. 13, the node "d" obtains link information indicating that the outward route evaluation value is "20" from the link table, and creates the HELLO packet.

The node "a" transmits a HELLO packet to the node "e" in addition to the node "d". The lower part of FIG. 13 illustrates HELLO packet transmission/reception performed between the node "a" and the node "e", and updates of the link table and the routing table.

Figure 14:
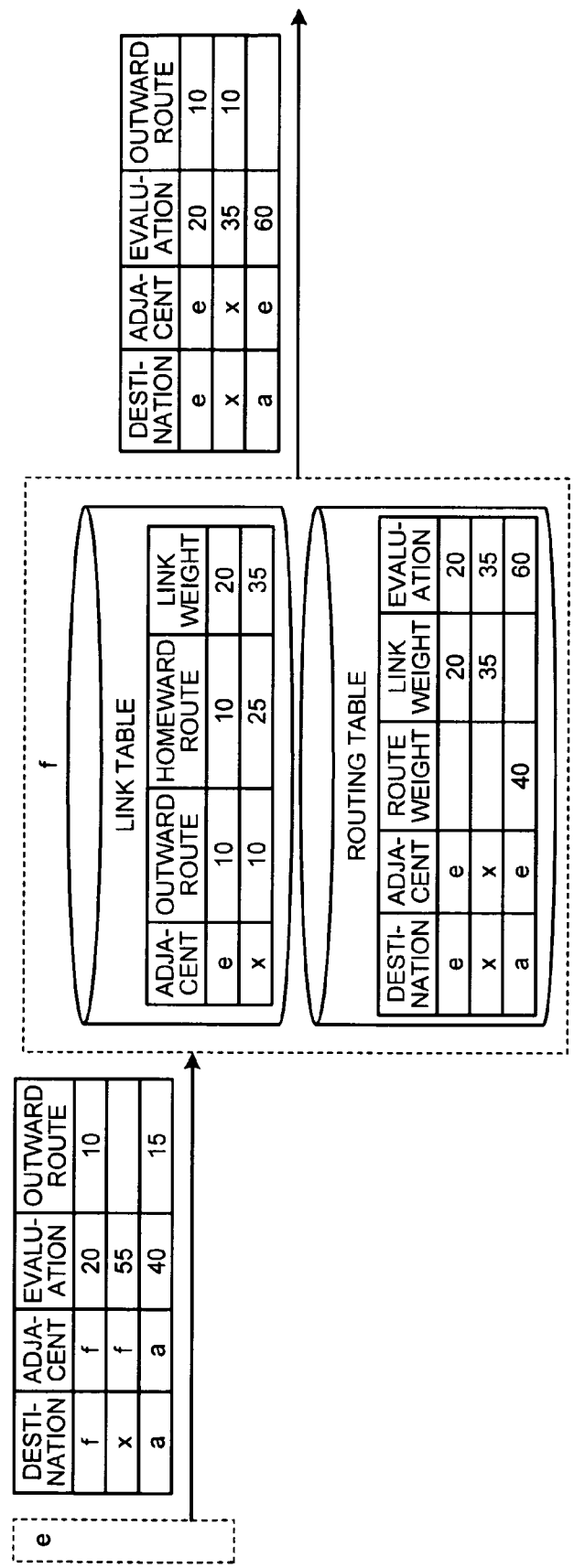
FIG. 14 is a diagram for explaining a table update example according to the first embodiment.

Next, as illustrated in FIG. 14, the node "e" transmits a HELLO packet to the node "f". When the node "f" receives the HELLO packet, first, the node "f" performs the link table update processing. Specifically, the node "f" identifies the transmission source node of the HELLO packet. The transmission source node is the node "e". Next, the node "f" newly creates a record in the uppermost row of the period table of the transmission source node "e", calculates the standard deviation of the periods, and thus calculates the outward route evaluation value "10". Although the value is not changed, the value is the latest value. Then, as illustrated in FIG. 14, the node "f" identifies the existing record of the node "e" in the link table, associates the outward route evaluation value "10" with the node "e", and overwrites the outward route evaluation value "10" in the record. Then, the node "f" determines whether the outward route evaluation value is included in the HELLO packet. Since the outward route evaluation value "10" is included in the HELLO packet, the node "f" determines that the outward route evaluation value is included in the HELLO packet. Then, as illustrated in FIG. 14, the node "f" associates the outward route evaluation value "10" included in the received HELLO packet with the transmission source node "e" in the link table, and stores the value as the homeward route evaluation value "10". Further, the node "f" calculates the link weight "20" by adding together the outward route evaluation value "10" and the homeward route evaluation value "10", and sets the link weight "20" in the link table.

Next, the node "f" performs the routing table update processing. Specifically, the node "f" identifies the transmission source node of the HELLO packet. The transmission source node is the node "e". Next, the node "f" newly creates a record of the node "e" in a work table having the same structure as that of the routing table. The node "f" sets the transmission source node "e" in the destination node of the work table, and sets the transmission source node "e" in the adjacent node of the work table. Then, the node "f" searches the link table by using the transmission source node "e", and obtains the link weight "20" that is associated with the node "e" and stored. Next, the node "f" stores the obtained link weight "20" in the record of the destination node "e" and the adjacent node "e" in the work table as the link weight "20". Then, the node "f" determines whether there is the same record in the routing table, and when there is the same record, as illustrated in FIG. 14, the node "f" overwrites the record created in the work table on the routing table.

Next, the node "f" determines whether information is included in the HELLO packet, and determines that information is included. The node "f" determines whether the destination node or the adjacent node is the node "f", and determines that the destination node or the adjacent node is the node "f". Next, the node "f" determines whether untreated information is included in the received packet, and determines that untreated information is included.

The node "f" determines whether the destination node or the adjacent node is the node "f", and determines that the adjacent node is the node "f". Next, the node "f" determines whether untreated information is included in the received packet, and determines that untreated information is included.

Then, the node "f" determines whether the destination node or the adjacent node is the node "f", and determines that neither the destination node nor the adjacent node is the node "f". Then, the node "f" newly creates a record of the node "a" in a work table having the same structure as that of the routing table. The node "f" sets the destination node "a" in the destination node of the work table, and sets the transmission source node "e" in the adjacent node of the work table. The node "f" stores the evaluation value "40" included in the HELLO packet as the route weight "40" in the work table. Next, the node "f" determines whether a record of the destination node "a" and the adjacent node "e" is included in the routing table, and determines that the record is not included. Then, as illustrated in FIG. 14, the node "f" newly adds the record created in the work table to the routing table.

Thereafter, the node "f" calculates an evaluation value and stores the evaluation value in the routing table. Specifically, since the destination node "e" is an adjacent node, the node "f" stores the link weight "20" as the evaluation value "20". Since the destination node "x" is an adjacent node, the node "f" stores the link weight "35" as the evaluation value "35". The node "f" searches for a record in which the adjacent node "e" is the destination node and the adjacent node. The node "f" obtains the link weight "20" in the searched record, adds together the obtained link weight "20" and the route weight "40" in the record of the destination node "a" and the adjacent node "e", and stores the addition result as an evaluation value "60".

It is assumed that the clock measures a predetermined period and a clock event occurs in the node "f". Then, the node "f" transmits a HELLO packet. The node "f" creates the HELLO packet from the routing table and transmits the HELLO packet to each of the adjacent node "e" and the adjacent node "x". In the description of FIG. 14, for convenience of description, it is assumed that the node "f" transmits the HELLO packet to only the node "x".

The node "f" searches the routing table and sorts records of the destination node "e", the destination node "x", and the destination node "a" into groups respectively. Since there are one record of the destination node "e", one record of the destination node "x", and one record of the destination node "a", the node "f" adds the record of the destination node "e", the record of the destination node "x", and the record of the destination node "a" to the HELLO packet, and transmits the HELLO packet to the adjacent node "x".

Figure 15:
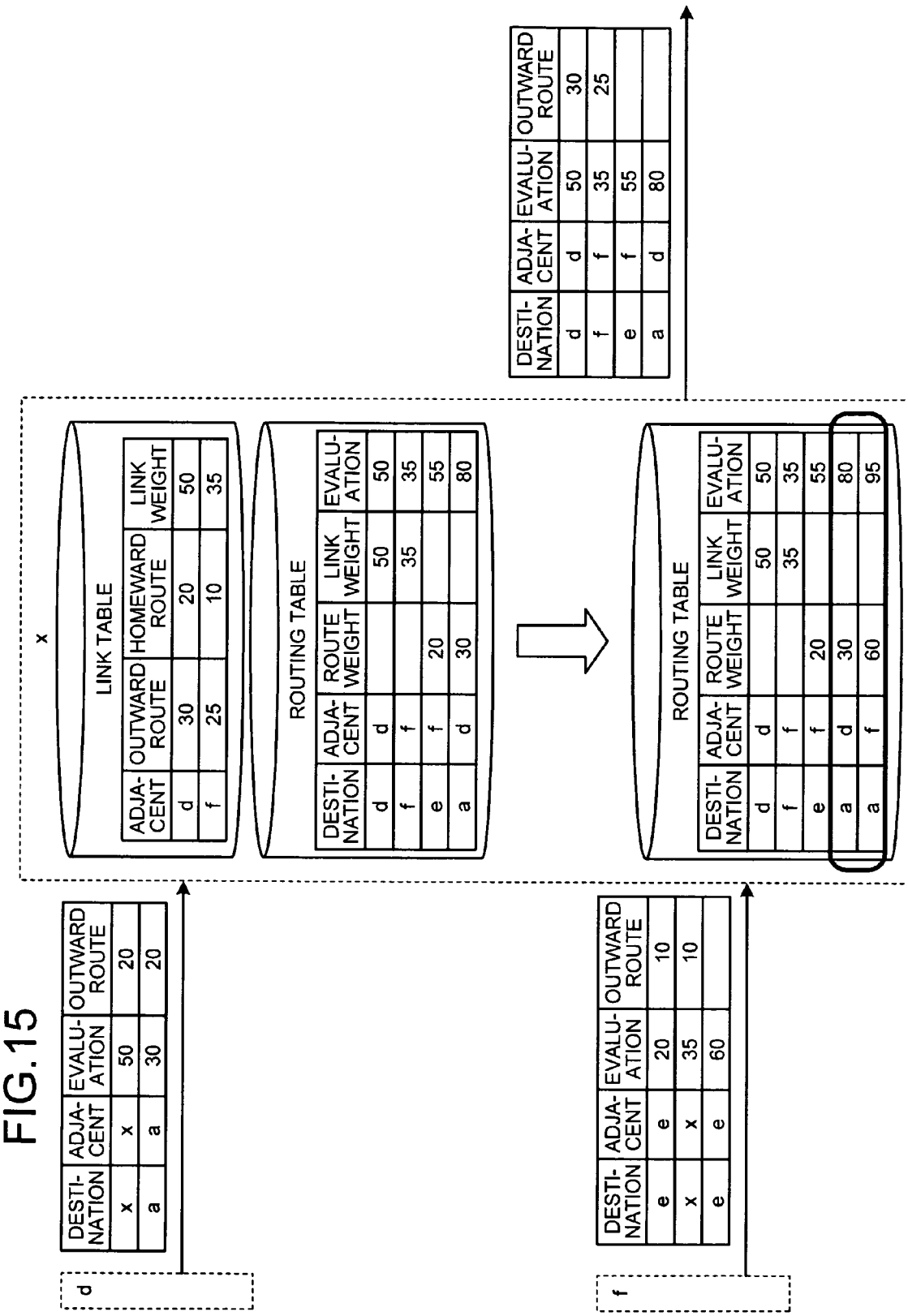
FIG. 15 is a diagram for explaining a table update example according to the first embodiment.

Similarly, as illustrated in FIG. 15, the node "d" transmits the HELLO packet to the node "x", and the node "f" transmits the HELLO packet to the node "x". In other words, in the description of the first embodiment, it is assumed that the node "x" receives the HELLO packets from each of the node "d" and the node "f" in a predetermined period.

First, as illustrated in FIG. 15, it is assumed that the node "x" receives the HELLO packet from the node "d". At this time, the node "x" updates the link table and the routing table in the same manner as the other nodes described above. Next, it is assumed that the node "x" receives the HELLO packet from the node "f". At this time, in the same manner, the node "x" updates the link table and the routing table.

It is assumed that the clock measures a predetermined period and a clock event occurs in the node "x". Then, the node "x" transmits a HELLO packet. The node "x" creates the HELLO packet from the routing table and transmits the HELLO packet to each of the adjacent node "d", the adjacent node "f", the adjacent node "v", and the adjacent node "z". In the description of FIG. 15, for convenience of description, it is assumed that the node "x" transmits the HELLO packet to only the node "v" and the node "z".

The node "x" searches the routing table and sorts records of the destination node "d", the destination node "f", the destination node "e", and the destination node "a" into groups respectively. Since there are one record of the destination node "d", one record of the destination node "f", and one record of the destination node "e", the node "x" adds the record of the destination node "e", the record of the destination node "f", and the record of the destination node "e" to the HELLO packet.

On the other hand, there is a plurality of records of the destination node "a". Therefore, the node "x" sorts the records of the destination node "a" into a group, compares the evaluation values in the group, and sets flags, each of which indicates a first level, a second level, and a third level, respectively. Specifically, since there are two records that is sorted into the group of the destination node "a" and the evaluation values are "80" and "95", the node "x" sets the first level flag in the record including the evaluation value "80", and sets the second level flag in the record including the evaluation value "95". The node "x" extracts the record in which the first level flag is set, and adds the record to the HELLO packet. Specifically, the node "x" extracts only the record of the transmission node "a" and the adjacent node "d", and adds the record to the HELLO packet. Then, the node "x" transmits the HELLO packet.

Link Table Update Processing

Figure 16:
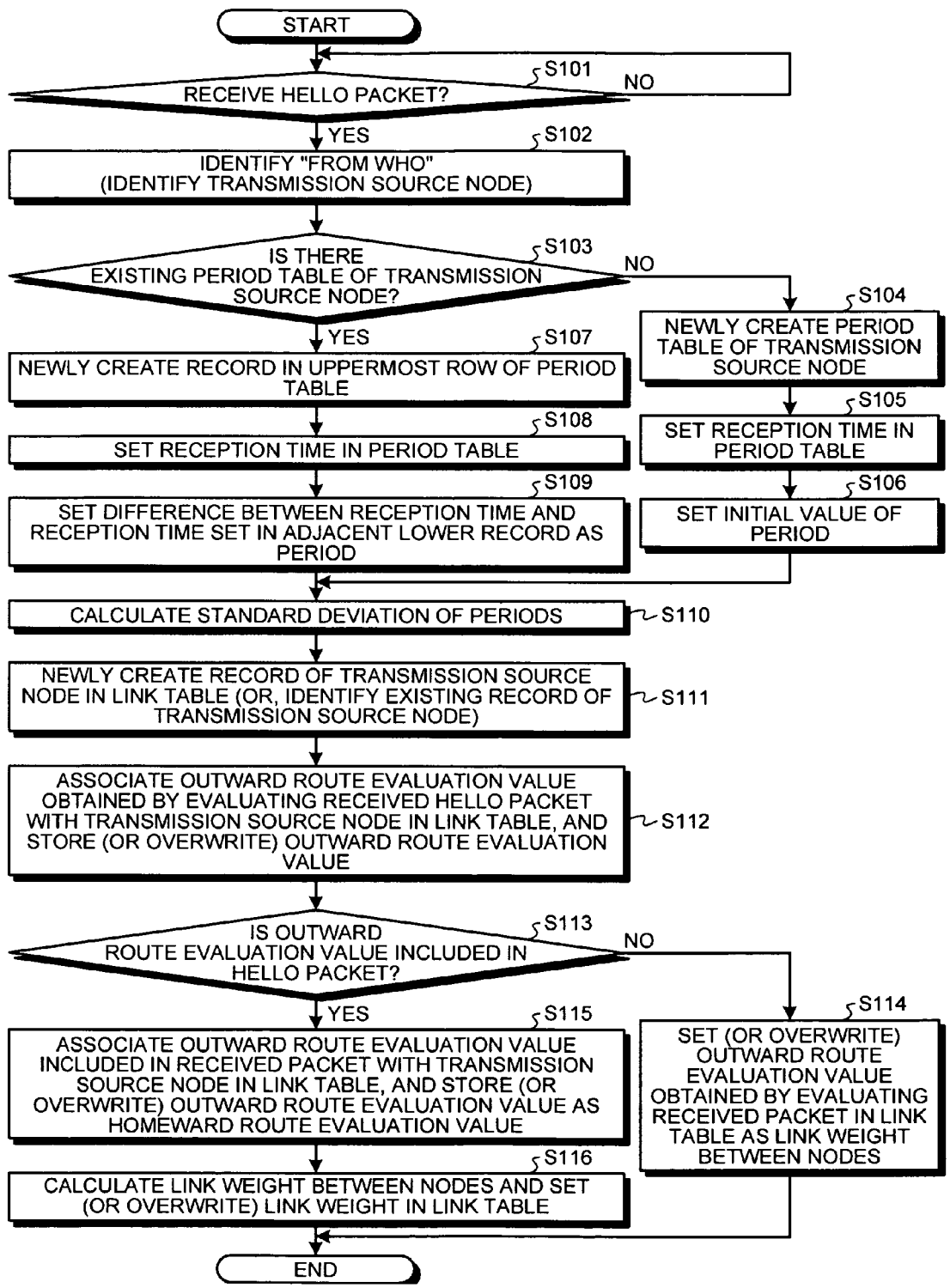
FIG. 16 is a flowchart illustrating a link table update processing according to the first embodiment.

The table update example according to the first embodiment has been described. Next, the link table update processing will be described with reference to FIG. 16. FIG. 16 is a flowchart illustrating the link table update processing according to the first embodiment.

The link table update unit 32 of the node 10 according to the first embodiment determines whether a HELLO packet is received from an adjacent node (step S101). When determining that no HELLO packet is received (step S101: No), the link table update unit 32 waits for reception of a HELLO packet.

On the other hand, when determining that a HELLO packet is received (step S101: Yes), the link table update unit 32 identifies "From Who" of the HELLO packet (step S102). In other words, the link table update unit 32 identifies the transmission source node which transmits the HELLO packet.

Next, the link table update unit 32 determines whether there is an existing period table of the transmission source node identified in step S102 in the period table 23 (step S103).

When determining that there is no existing period table (step S103: No), the link table update unit 32 newly creates a period table of the transmission source node, and newly creates a record of ID "1" (step S104). Then, the link table update unit 32 sets the reception time at which the HELLO packet is received in the record of ID "1" (step S105). For example, the link table update unit 32 sets a reception time "0:00". The link table update unit 32 also sets an initial value of the period in the record of ID "1" (step S106). For example, the link table update unit 32 sets a period "0:00".

On the other hand, when determining that there is an existing period table (step S103: Yes), the link table update unit 32 newly creates a record in the uppermost row of the period table (step S107). Then, the link table update unit 32 sets the reception time at which the HELLO packet is received in the newly created record (step S108). Then, the link table update unit 32 calculates a difference between the reception time set in step S108 and the reception time set in the adjacent lower record, and sets the difference as a period (step S109). Next, the link table update unit 32 calculates the standard deviation of the periods (step S110).

Next, the link table update unit 32 newly creates a record of the transmission source node in the link table (step S111). Or, the link table update unit 32 identifies an existing record of the transmission source node from the link table (step S111).

The link table update unit 32 associates the outward route evaluation value obtained by evaluating the received HELLO packet (specifically, the outward route evaluation value derived from the standard deviation calculated in step S110) with the transmission source node in the link table, and stores the outward route evaluation value (step S112). Or, the link table update unit 32 overwrites the outward route evaluation value on an existing record (step S112).

Next, the link table update unit 32 determines whether an outward route evaluation value is included in the received HELLO packet (step S113). When determining that no outward route evaluation value is included (step S113: No), the link table update unit 32 sets the outward route evaluation value obtained by evaluating the received packet in the link table as a link weight between the nodes (step S114). Or, the link table update unit 32 overwrites the outward route evaluation value on an existing record (step S114).

When determining that an outward route evaluation value is included (step S113: Yes), the link table update unit 32 associates the outward route evaluation value included in the received HELLO packet with the transmission source node in the link table, and stores the outward route evaluation value as a homeward route evaluation value (step S115). Or, the link table update unit 32 overwrites the outward route evaluation value on an existing record (step S115).

The link table update unit 32 calculates the link weight between the nodes by adding together the outward route evaluation value and the homeward route evaluation value, and sets the link weight in the link table (step S116). Or, the link table update unit 32 overwrites the link weight on an existing record (step S116).

Routing Table Update Processing

Figure 17A:
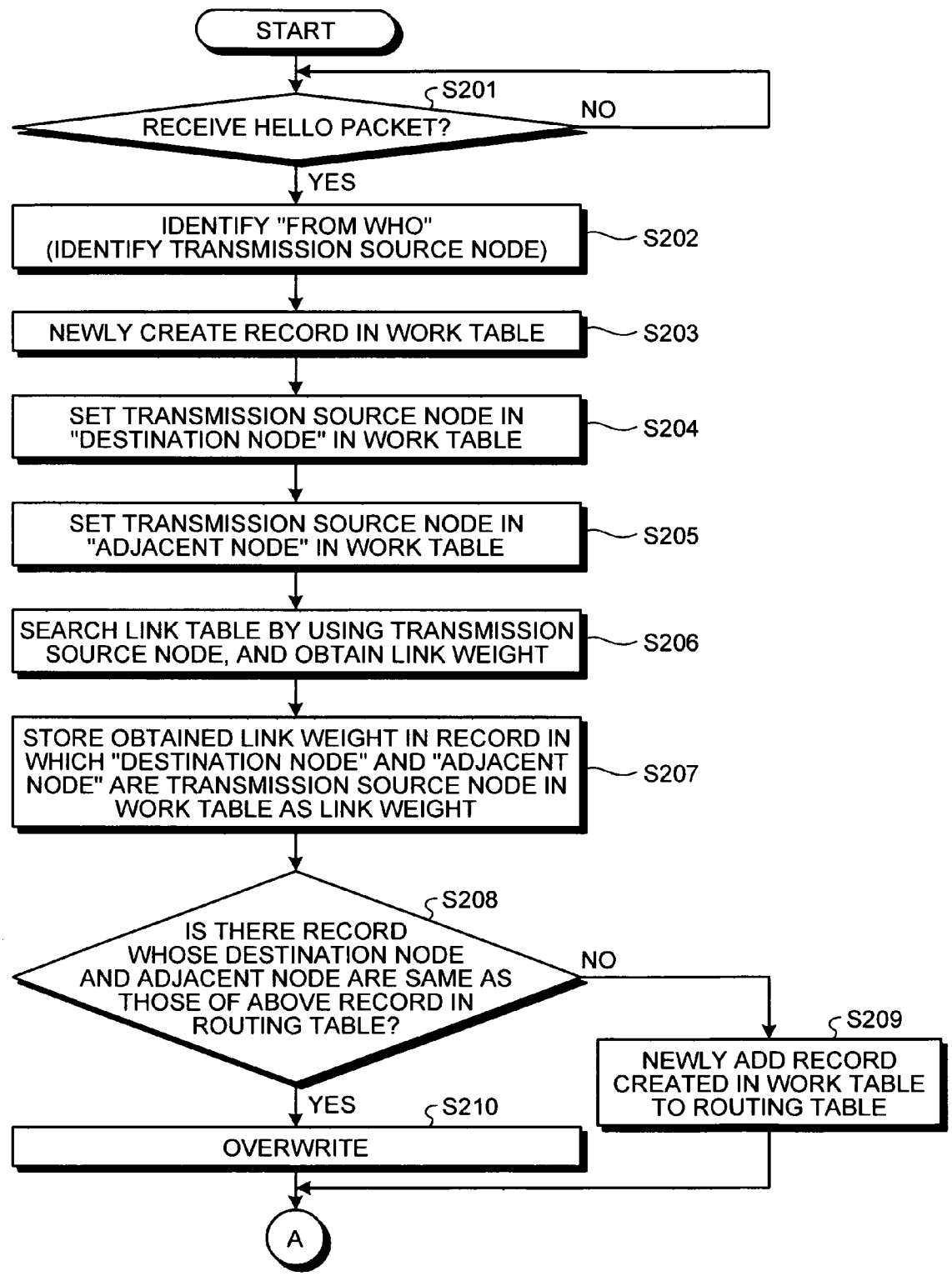
FIG. 17A is a flowchart illustrating a routing table update processing according to the first embodiment.
Figure 17B:
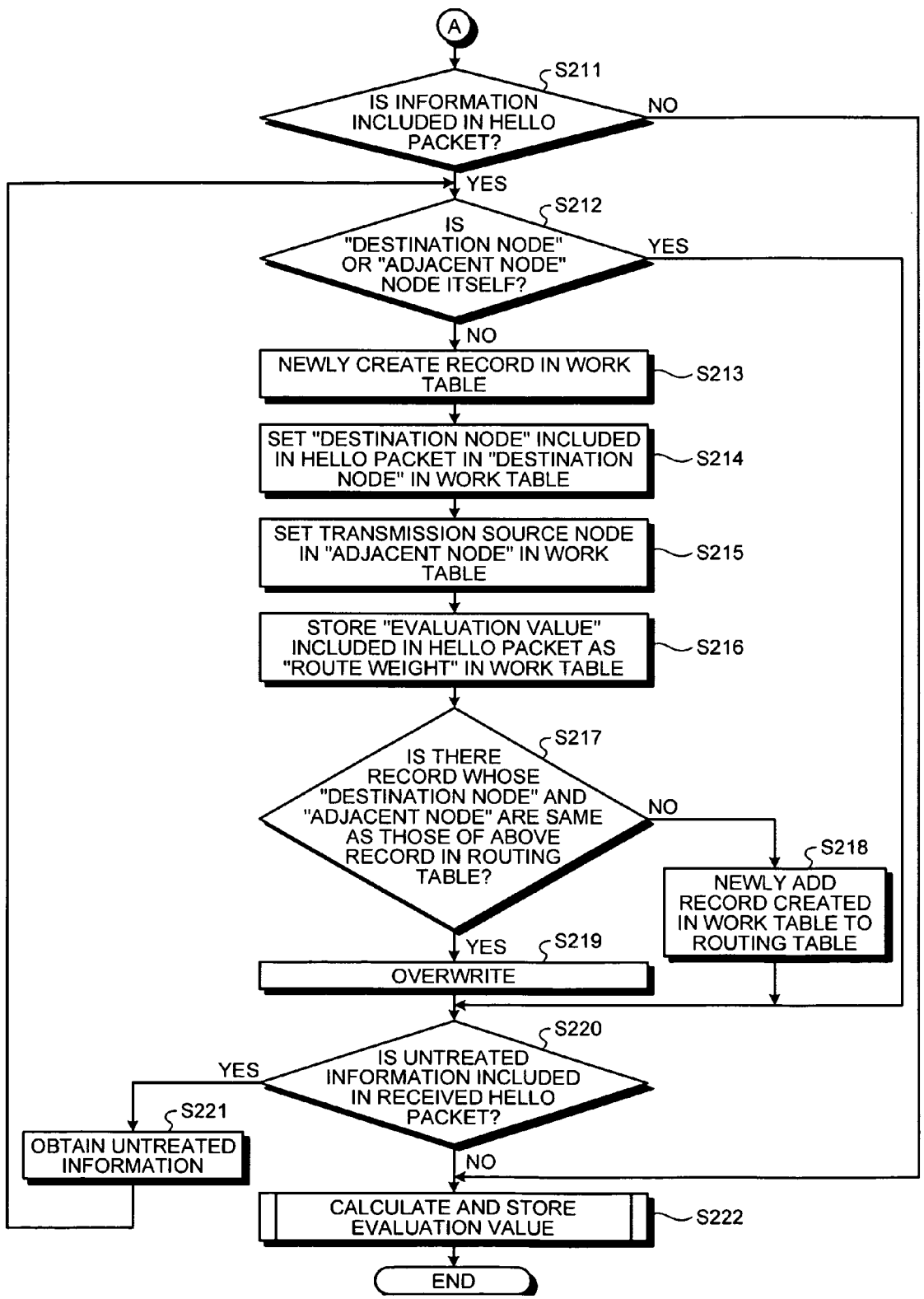
FIG. 17B is a flowchart illustrating the routing table update processing according to the first embodiment.

Next, the routing table update processing will be described with reference to FIGS. 17A and 17B. FIGS. 17A and 17B are flowcharts illustrating the routing table update processing according to the first embodiment.

The routing table update unit 33 of the node 10 according to the first embodiment determines whether a HELLO packet is received from an adjacent node (step S201). When determining that no HELLO packet is received (step S201: No), the routing table update unit 33 waits for reception of a HELLO packet.

On the other hand, when determining that a HELLO packet is received (step S201: Yes), the routing table update unit 33 identifies "From Who" of the HELLO packet (step S202). In other words, the routing table update unit 33 identifies the transmission source node which transmits the HELLO packet.

Next, the routing table update unit 33 newly creates a record in the work table 24 (step S203). The routing table update unit 33 sets the transmission source node identified in step S202 in the destination node of the newly created record (step S204), and sets the transmission source node identified in step S202 in the adjacent node (step S205).

Next, the routing table update unit 33 searches the link table 22 by using the transmission source node, and obtains the link weight that is associated with the transmission source node and stored (step S206).

Then, the routing table update unit 33 stores the obtained link weight in a record in which the destination node and the adjacent node are the transmission source node in the work table 24 as the link weight (step S207).

Next, the routing table update unit 33 determines whether there is a record whose destination node and adjacent node are the same as those of the above record in the routing table 21 (step S208). When determining that there is not such a record (step S208: No), the routing table update unit 33 newly adds the record created in the work table 24 to the routing table 21 (step S209). On the other hand, when determining that there is such a record (step S208: Yes), the routing table update unit 33 overwrites the record on the routing table 21 (step S210).

Next, the routing table update unit 33 determines whether information is included in the HELLO packet (step S211). When determining that no information is included (step S211: No), the routing table update unit 33 proceeds to processing for calculating an evaluation value (step S222).

On the other hand, when determining that information is included (step S211: Yes), the routing table update unit 33 determines whether the destination node or the adjacent node is the node 10 itself (step S212). When determining that the destination node or the adjacent node is the node 10 itself (step S212: Yes), the routing table update unit 33 ignores the information, and proceeds to processing (step S220) for determining whether untreated information is included in the received HELLO packet.

On the other hand, when determining that neither the destination node nor the adjacent node is the node 10 itself (step S212: No), the routing table update unit 33 newly creates a record in the work table 24 (step S213). Then, the routing table update unit 33 sets the destination node included in the information of the HELLO packet in the destination node of the newly created record (step S214), and sets the transmission source node in the adjacent node (step S215).

Next, the routing table update unit 33 stores the evaluation value included in the information of the HELLO packet in the record newly created in the work table 24 as the route weight (step S216).

Next, the routing table update unit 33 determines whether there is a record whose destination node and adjacent node are the same as those of the above record in the routing table 21 (step S217). When determining that there is not such a record (step S217: No), the routing table update unit 33 newly adds the record created in the work table 24 to the routing table 21 (step S218). On the other hand, when determining that there is such a record (step S217: Yes), the routing table update unit 33 overwrites the record on the routing table 21 (step S219).

Thereafter, the routing table update unit 33 determines whether untreated information is included in the received HELLO packet (step S220), and when there is untreated information (step S220: Yes), the routing table update unit 33 obtains the untreated information (step S221) and returns to the processing of step S212. On the other hand, when there is no untreated information (step S220: No), the routing table update unit 33 calculates an evaluation value and stores the evaluation value in the routing table 21 (step S222).

Evaluation Value Calculation Processing

Figure 18:
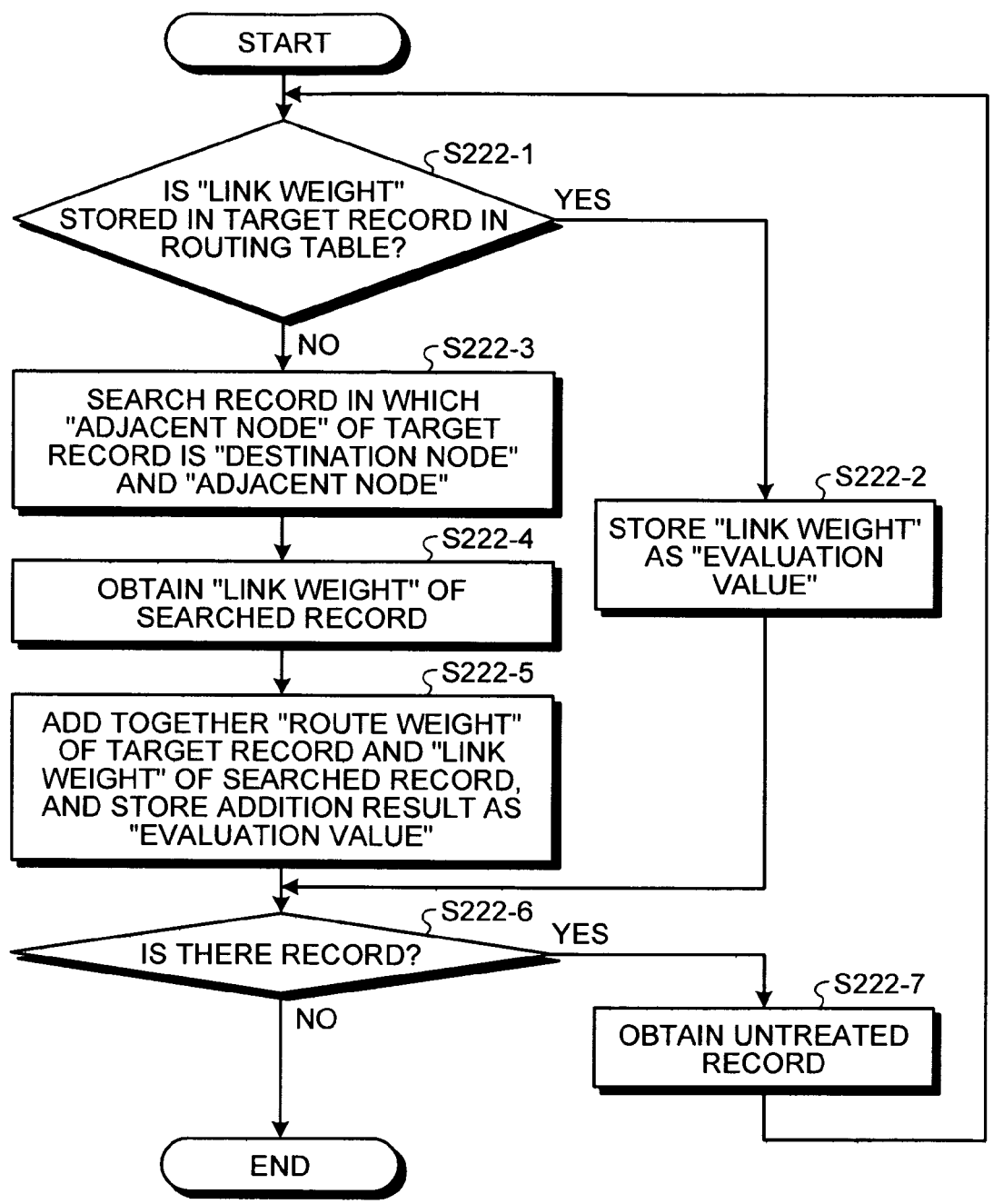
FIG. 18 is a flowchart illustrating evaluation value calculation processing according to the first embodiment.

Next, the evaluation value calculation processing will be described with reference to FIG. 18. FIG. 18 is a flowchart illustrating the evaluation value calculation processing.

First, the routing table update unit 33 determines whether a link weight is stored in a target record in the routing table 21 (step S222-1). When determining that a link weight is stored (step S222-1: Yes), the routing table update unit 33 stores the stored link weight as the evaluation value of the record (step S222-2).

On the other hand, when determining that no link weight is stored (step S222-1: No), the routing table update unit 33 searches for a record in which the adjacent node of the target record is the destination node and the adjacent node (step S222-3).

Then, the routing table update unit 33 obtains the link weight of the searched record (step S222-4), adds together the route weight of the target record and the link weight of the searched record, and stores the addition result as the evaluation value of the target record (step S222-5).

Thereafter, the routing table update unit 33 determines whether there is untreated record (step S222-6), and when there is untreated record (step S222-6: Yes), the routing table update unit 33 obtains the untreated record (step S222-7) and returns to the processing of step S222-1. On the other hand, when there is no untreated record (step S222-6: No), the routing table update unit 33 ends the processing.

Transmission Processing

Figure 19:
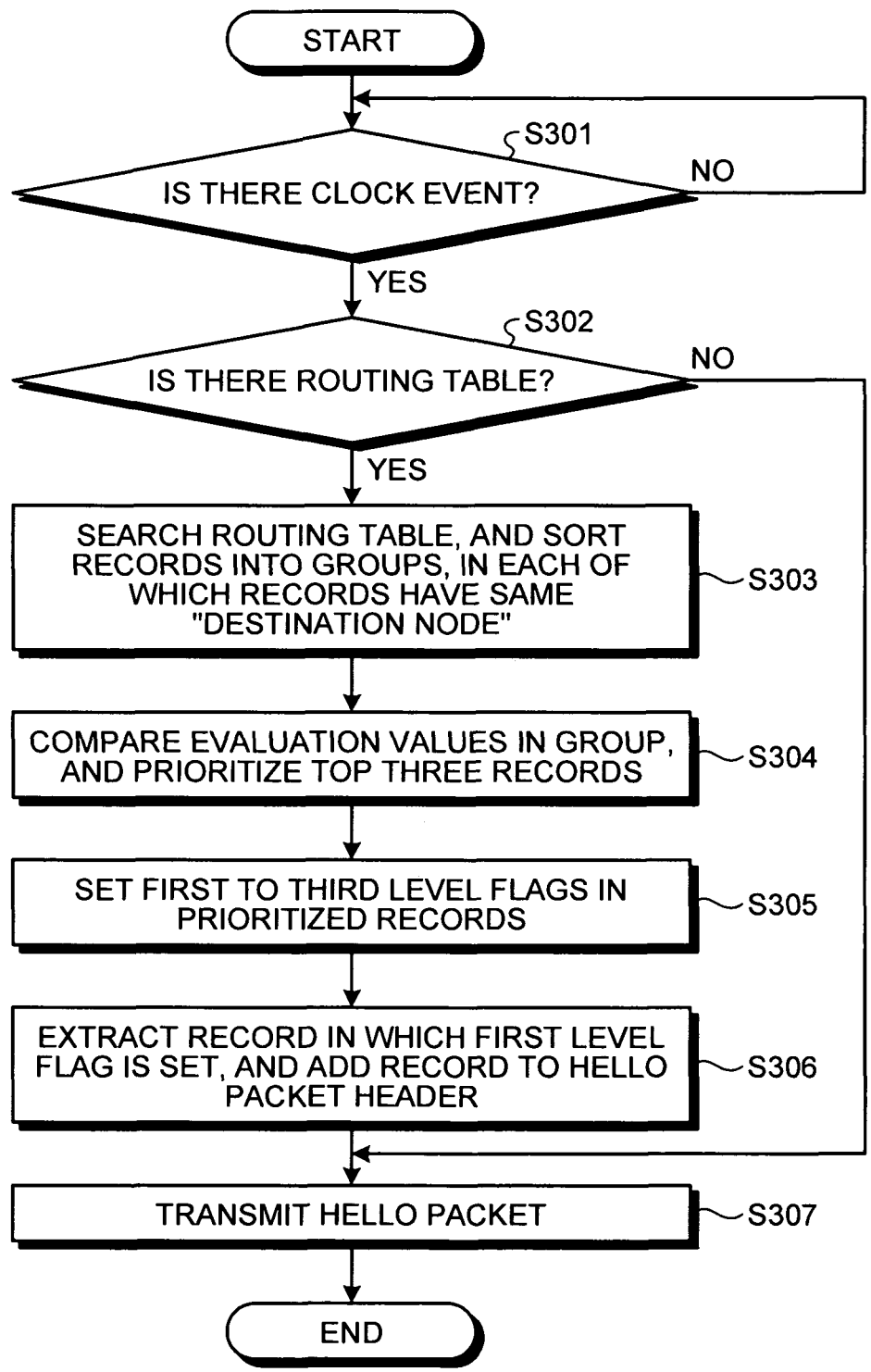
FIG. 19 is a flowchart illustrating transmission processing according to the first embodiment.

Next, the transmission processing will be described with reference to FIG. 19. FIG. 19 is a flowchart illustrating the transmission processing according to the first embodiment.

The route information transmitting unit 34 of the node 10 according to the first embodiment determines whether there is a clock event (step S301). When determining that there is no clock event (step S301: No), the route information transmitting unit 34 waits for a clock event.

On the other hand, when determining that there is a clock event (step S301: Yes), the route information transmitting unit 34 determines whether there is a routing table (step S302). When determining that there is no routing table (step S302: No), the route information transmitting unit 34 transmits an empty HELLO packet (step S307), and ends the processing.

When determining that there is a routing table (step S302: Yes), the route information transmitting unit 34 searches the routing table 21, and sorts records into groups, in each of which records have the same destination node (step S303).

Next, the route information transmitting unit 34 compares the evaluation values in each group, and prioritizes top three records in ascending order of the evaluation values (in an order from the highest quality to the lowest quality) (step S304).

The route information transmitting unit 34 sets a first level flag, a second level flag, and a third level flag in the prioritized records (step S305), extracts the record in which the first level flag is set, and adds the record to a HELLO packet header (step S306). The route information transmitting unit 34 according to the first embodiment sets "transmission flag" to "Yes" in the record added to the HELLO packet header.

Thereafter, the route information transmitting unit 34 transmits the HELLO packet (step S307), and ends the processing.

Effect of First Embodiment

As described above, the first embodiment is a route information relay method by which each node relays route information in an ad hoc network in which each node relays a packet on the basis of the route information (information indicating a route for transmitting the packet to a destination node). In the first embodiment, each node receives the route information from a node (adjacent node) connected to the node. Each node obtains quality information (evaluation value) indicating quality of a route indicated by the route information with respect to the received route information. At a predetermined frequency (for every clock event), each node determines whether a plurality of route information items whose packet destination nodes are the same are received. When it is determined that a plurality of route information items whose packet destination nodes are the same are received, each node compares quality information items (evaluation values) of the plurality of received route information items, and selects a route information item corresponding to a quality information item (evaluation value) indicating the highest quality as a comparison result. Each node relays the selected route information to nodes (adjacent nodes) that are connected to the node and are other than the node that has transmitted the route information.

In this way, each node according to the first embodiment can reduce the amount of communication to control the route.

Each node of a conventional technique transmits the received route information to adjacent nodes every time the node receives the route information. As a result, each node has to transmit the route information a plurality of times, and a control header portion is added to each HELLO packet, so that overhead increases because a transmission waiting time is required for each HELLO packet. Further, when the number of transmitted route information items increases, the frequency of collisions increases, and thus the number of retransmissions of the route information increases. Therefore, if a conventional technique is applied to a large scale ad hoc network, a flooding due to excessive packets occurs, and also it is difficult to create a routing table for searching a route.

On the other hand, each node according to the first embodiment does not necessarily transmit the received route information to adjacent nodes every time the node receives the route information. Each node determines whether a plurality of route information items whose packet destination nodes are the same are received at a predetermined frequency, compares quality information items, and selects a route information item corresponding to a quality information item indicating the highest quality. Then, each node relays only the selected route information to adjacent nodes. As a result, each node can reduce the number of transmission times of the route information, and also reduce the overhead. Further, when the number of transmitted route information items decreases, the frequency of collisions decreases, and thus the number of retransmissions of the route information decreases. Therefore, even when the technique of the first embodiment is applied to a large scale ad hoc network, a flooding due to excessive packets does not occur, and it is not difficult to create a routing table for searching for a route.

Figures 20, 21:
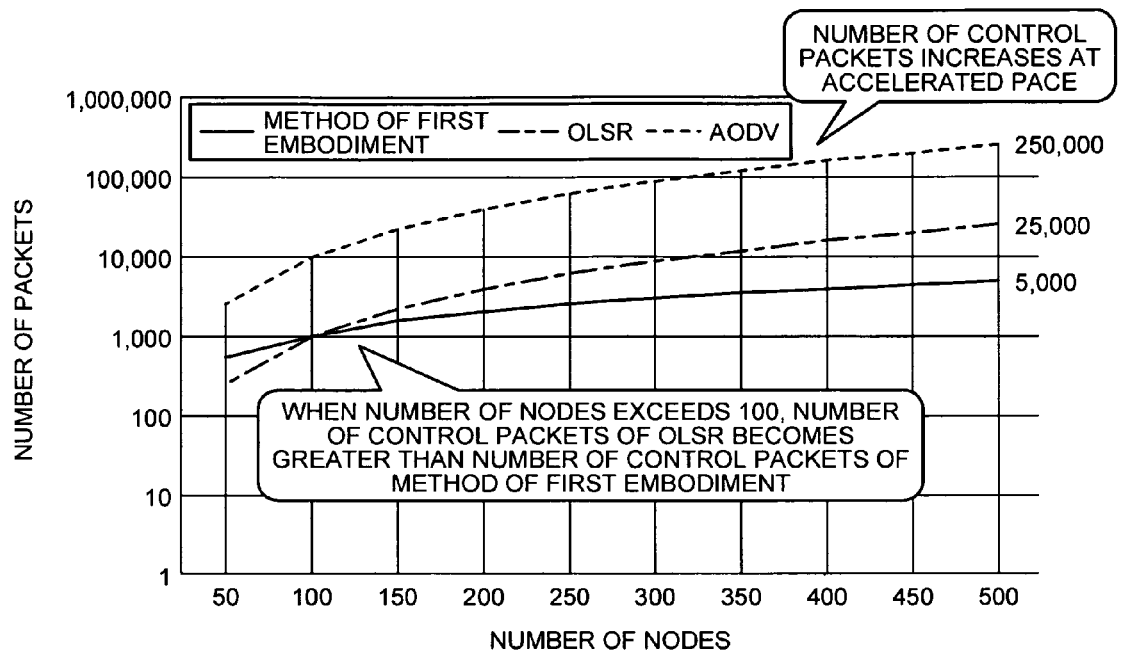
FIG. 20 is a diagram for explaining an effect of the first embodiment.
FIG. 21 is a diagram for explaining a routing table according to a second embodiment.

For example, as illustrated in FIG. 20, it is known that the method of the first embodiment reduces the amount of communication for controlling route as compared with methods of Optimized Link State Routing protocol (OLSR) and Ad hoc On demand Distance Vector (AODV). Specifically, when the number of nodes exceeds 100, the number of control packets of OLSR becomes greater than the number of control packets of the method of the first embodiment. It is known that the number of control packets increases at an accelerated pace in AODV.

[b] Second Embodiment

In the first embodiment described above, the method in which the node 10 transmits all the route information items corresponding to the highest evaluation value (all the records in which the first level flag is set) to adjacent nodes is described. In a second embodiment, instead of the method in which the node 10 transmits all the route information items corresponding to the highest evaluation value, a method in which the node 10 transmits the route information only when the node 10 compares a current evaluation value and a previous evaluation value and finds that the difference between the current evaluation value and the previous evaluation value is greater than or equal to a predetermined threshold value will be described.

First, the routing table 21 according to the second embodiment will be described with reference to FIG. 21. FIG. 21 is a diagram for explaining the routing table according to the second embodiment.

As illustrated in FIG. 21, the routing table 21 according to the second embodiment further stores an evaluation value ("previous transmission value") of when the route information transmitting unit 34 transmitted previous route information. Specifically, the routing table 21 stores an evaluation value stored in "evaluation value" which is stored by the route information transmitting unit 34 when the route information transmitting unit 34 transmits the route information in the "previous transmission value". The "previous transmission value" stored in the routing table 21 is used for processing performed by the route information transmitting unit 34.

Figure 22:
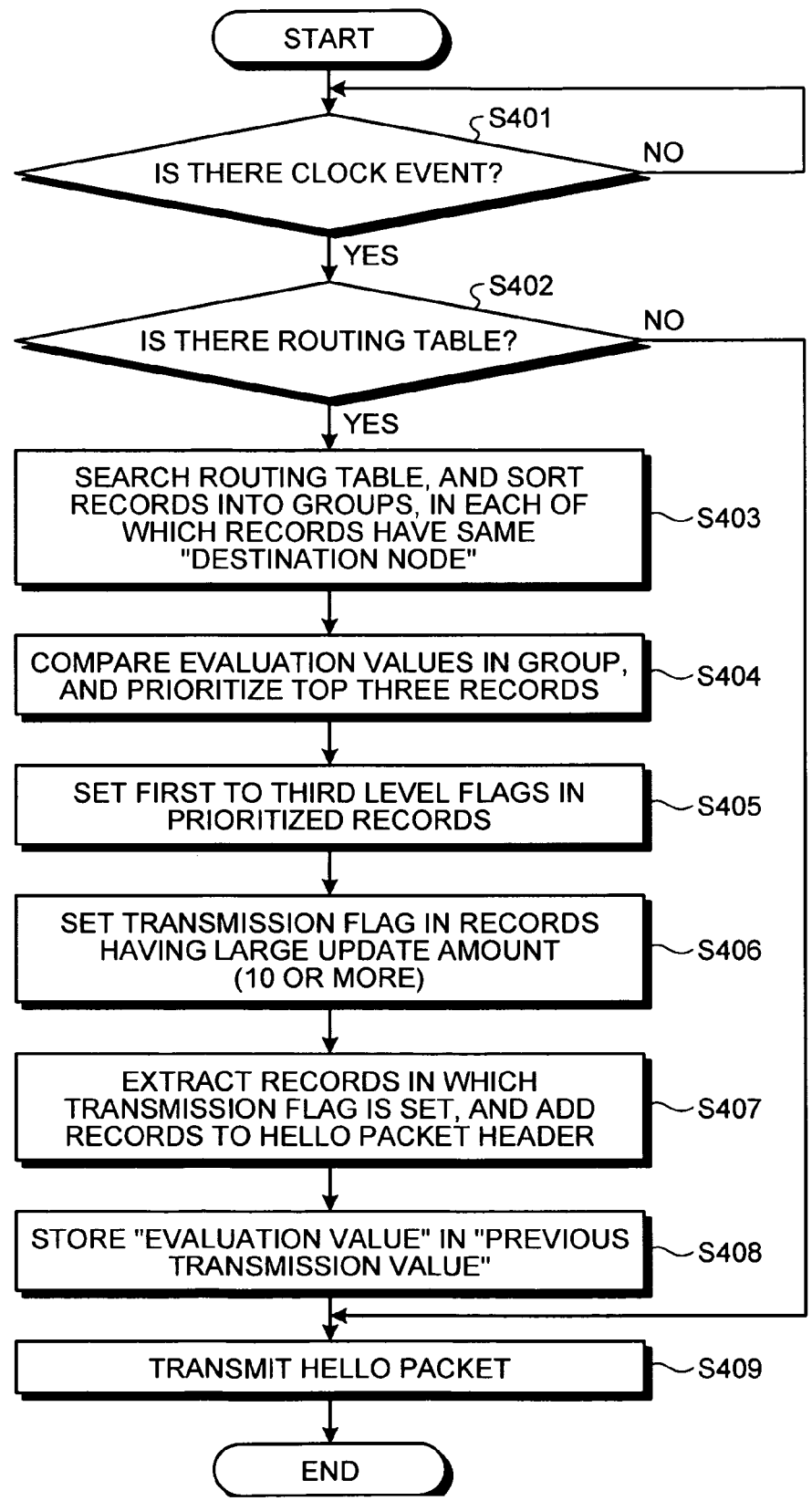
FIG. 22 is a flowchart illustrating transmission processing according to the second embodiment.

Next, transmission processing according to the second embodiment will be described with reference to FIG. 22. FIG. 22 is a flowchart illustrating the transmission processing according to the second embodiment.

As illustrated in FIG. 22, in the same manner as in the first embodiment, the route information transmitting unit 34 according to the second embodiment determines whether there is a clock event (step S401), and determines whether there is a routing table (step S402). When determining that there is a routing table (step S402: Yes), in the same manner as in the first embodiment, the route information transmitting unit 34 searches the routing table 21, and sorts records into groups, in each of which records have the same destination node (step S403). Next, in the same manner as in the first embodiment, the route information transmitting unit 34 compares the evaluation values in each group, and prioritizes top three records in ascending order of the evaluation values (in an order from the highest quality to the lowest quality) (step S404). Then, in the same manner as in the first embodiment, the route information transmitting unit 34 sets the first level flag, the second level flag, and the third level flag in the prioritized records (step S405).

Next, the route information transmitting unit 34 according to the second embodiment compares "evaluation value" and "previous transmission value" in the routing table 21, and sets a transmission flag in records having a large update amount (step S406). For example, the route information transmitting unit 34 sets the transmission flag "YES" in records having an update amount of "10" or more.

The route information transmitting unit 34 extracts the records in which the transmission flag is set, and adds the records to the HELLO packet header (step S407). The route information transmitting unit 34 stores the "evaluation value"

in the "previous transmission value" with respect to the records in which the transmission flag is set (step S408).

Thereafter, in the same manner as in the first embodiment, the route information transmitting unit 34 transmits the HELLO packet (step S409), and ends the processing.

Effect of Second Embodiment

As described above, in the second embodiment, each node stores a correspondence relationship between the received route information and the quality information (previous transmission value) of when the route information was relayed the previous time in the routing table. Each node searches the routing table by using the currently selected route information, and compares the quality information (previous transmission value) corresponding to the route information and the current quality information (evaluation value) of when the route information is selected in the routing table. When the difference between the quality information items indicated by the above quality information items is greater than or equal to a predetermined threshold value (for example, greater than or equal to "10"), each node relays the selected route information.

In this way, according the second embodiment, each node does not relay the route information which has been transmitted to adjacent nodes and whose quality evaluation is not so much changed from the previous data, so that the amount of communication to control the route can be further reduced.

[c] Third Embodiment

By the way, in the first embodiment and the second embodiment, the method by which the node 10 selects a route when transmitting a packet does not use information related to a data packet (a packet for transmitting/receiving actual data). Therefore, in a third embodiment, a method in which the node 10 corrects the evaluation value of the route on the basis of the information related to the data packet, so that the information related to the data packet is used for selecting the route will be described.

Configuration of Node According to Third Embodiment

Figure 23:
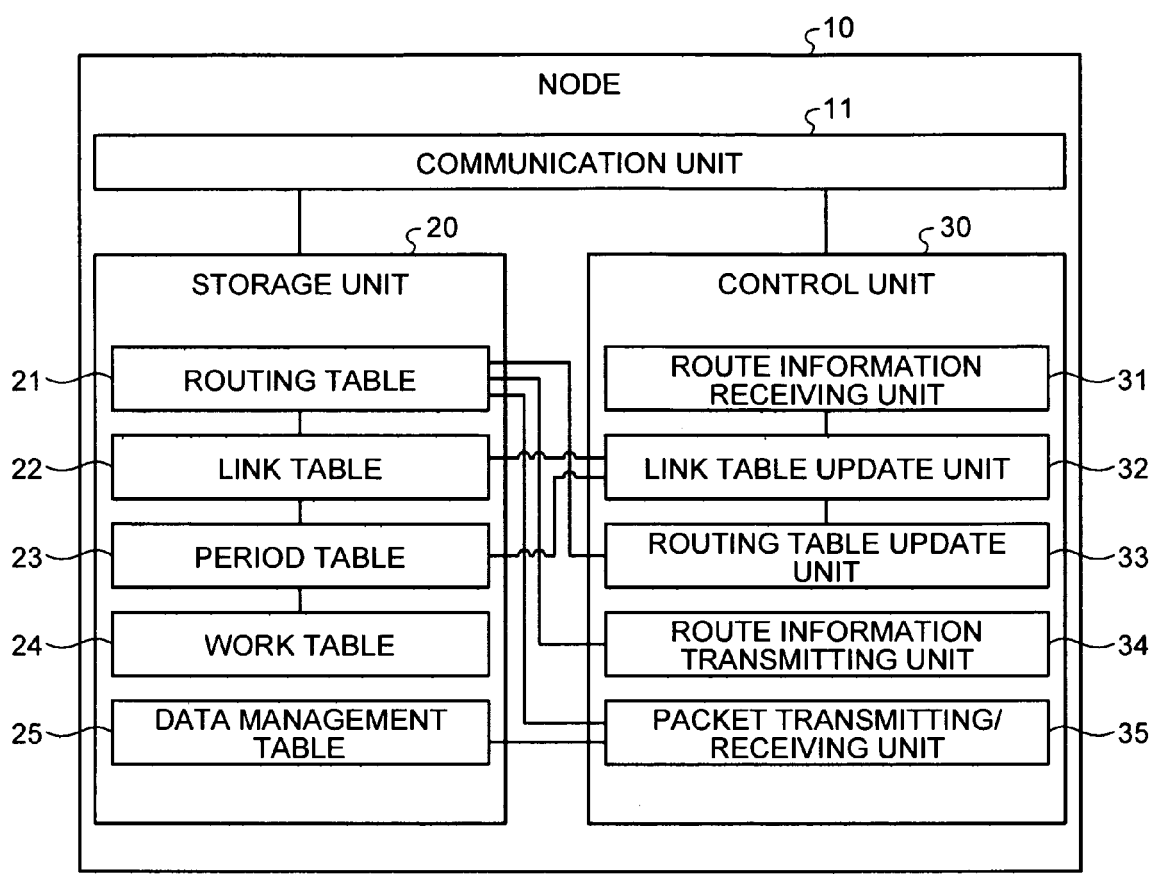
FIG. 23 is a block diagram illustrating a configuration of a node according to a third embodiment.

First, a configuration of a node according to the third embodiment will be described with reference to FIGS. 23 to 25. FIG. 23 is a block diagram illustrating the configuration of the node according to the third embodiment. FIG. 24 is a diagram for explaining a data management table according to the third embodiment. FIG. 25 is a diagram for explaining a routing table according to the third embodiment.

As illustrated in FIG. 23, the node 10 according to the third embodiment further includes a data management table 25 in the storage unit 20. The data management table 25 stores information related to a data packet transmitted by the packet transmitting/receiving unit 35. Specifically, in the data management table 25, a time considered to be the time of successful reception of a response packet (hereinafter referred to as "data ACK") and the like is stored by the packet transmitting/receiving unit 35 when the data packet is transmitted by the packet transmitting/receiving unit 35. The information stored in the data management table 25 is used for processing performed by the packet transmitting/receiving unit 35.

For example, as illustrated in FIG. 24, the data management table 25 stores an ID ("ID") for identifying a data packet, a destination node ("destination"), an adjacent node ("adjacent"), and a time ("waiting time point") considered to be the time of successful reception of data ACK. For example, when the node "x" transmits a data packet to the node "a" as the destination, there are a route for transmitting the data packet to the adjacent node "d" and a route for transmitting the data packet to the adjacent node "f". Although, the data management table 25 according to the third embodiment can store information for both routes, in FIG. 24, only the route for transmitting the data packet to the adjacent node "d" is illustrated.

Here, the "waiting time point" will be described. When the node 10 transmits a data packet, the node 10 receives data ACK responding to the transmitted data packet. Therefore, the node 10 can evaluate the quality of the route through which the data packet is transmitted by the time point when the data ACK is received. In other words, if the time point when the data ACK is received is later than a time point considered to be a normal time point when the data ACK should be received, the quality of the route is generally considered to be bad. In other words, if the time point when the data ACK is received is earlier than a time point considered to be a normal time point when the data ACK should be received, the quality of the route is generally considered to be good. Based on this, in the third embodiment, the node 10 sets "waiting time point" in the data management table 25.

In the third embodiment, as illustrated in FIG. 25, the node 10 stores "success coefficient" in the routing table 21. Specifically, in the routing table 21, when data ACK is received by the packet transmitting/receiving unit 35, a "success coefficient" is stored or an "evaluation value" is updated by the packet transmitting/receiving unit 35. Here, the "success coefficient" is a coefficient indicating whether data ACK is received by the time set in the "waiting time point" in the data management table 25. In the third embodiment, the "success coefficient" is, for example, a value from "0" to "10".

In the third embodiment, when the packet transmitting/receiving unit 35 receives data ACK by the time set in the "waiting time point", the packet transmitting/receiving unit 35 updates the value of "success coefficient" in the routing table 21 to a smaller value (for example, decrement by 1), and updates the "evaluation value" so that the updated "success coefficient" is reflected in the "evaluation value". On the other hand, when the packet transmitting/receiving unit 35 does not receive data ACK by the time set in the "waiting time point", the packet transmitting/receiving unit 35 updates the value of "success coefficient" in the routing table 21 to a greater value (for example, increment by 1), and updates the "evaluation value" so that the updated "success coefficient" is reflected in the "evaluation value".

Processing Procedure of Node according to Third Embodiment

Figure 26:
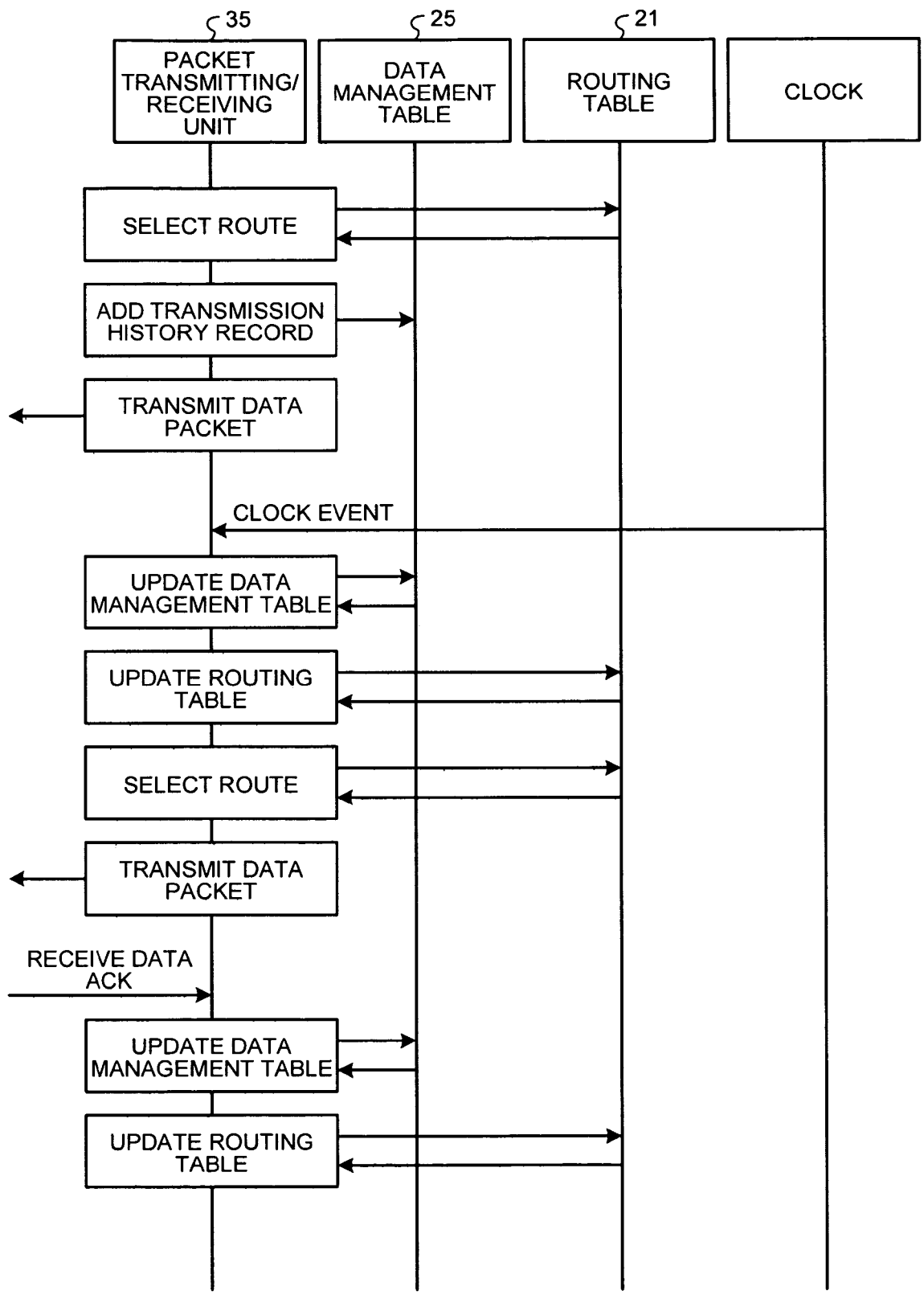
FIG. 26 is a diagram for explaining a processing procedure (as a whole) of a node according to the third embodiment.
Figure 27:
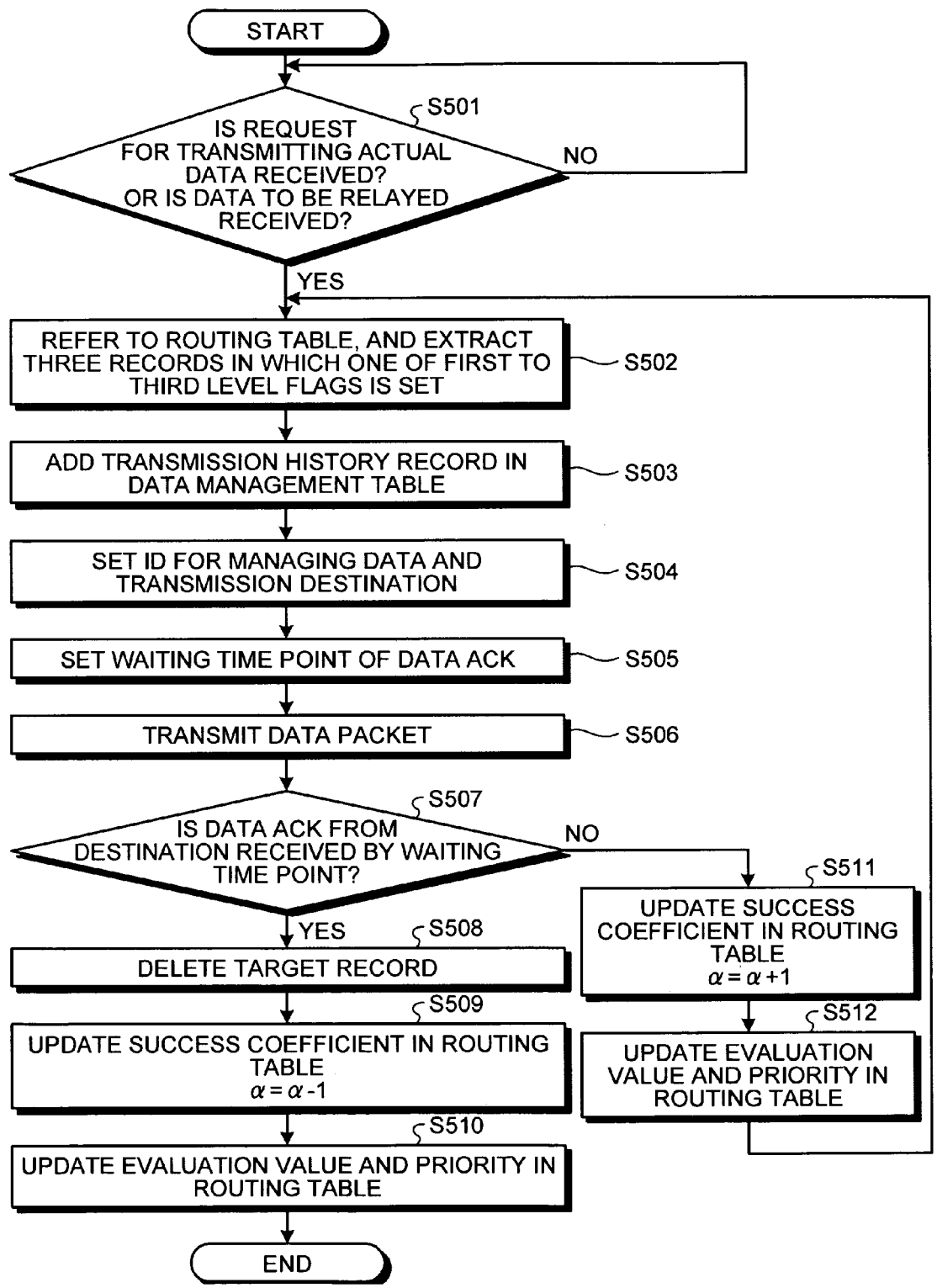
FIG. 27 is a flowchart illustrating data management table update processing according to the third embodiment.

Next, a processing procedure of a node according to the third embodiment will be described with reference to FIGS. 26 and 27. FIG. 26 is a diagram for explaining the processing procedure (as a whole) of the node according to the third embodiment. FIG. 27 is a flowchart illustrating data management table update processing according to the third embodiment.

As illustrated in FIG. 26, the node 10 according to the third embodiment selects a route by referring to the routing table 21 when transmitting a data packet by using the packet transmitting/receiving unit 35. Next, the packet transmitting/receiving unit 35 adds a record for managing transmission history of the data packet to be transmitted in the data management table 25, and transmits the data packet. At this time, the packet transmitting/receiving unit 35 sets a "waiting time point" of data ACK in the data management table 25.

The packet transmitting/receiving unit 35 receives a clock event in a specific period of time from a clock operating asynchronously with transmission of the data packet, and compares a current time calculated from the reception timing and the "waiting time point" set in the data management table 25. When the packet transmitting/receiving unit 35 does not receive data ACK by the "waiting time point", the packet transmitting/receiving unit 35 retransmits the data packet. Specifically, as illustrated in FIG. 26, the packet transmitting/receiving unit 35 updates the routing table 21, newly selects a route on the basis of the updated routing table 21, and retransmits the data packet.

Next, when the packet transmitting/receiving unit 35 receives data ACK by the "waiting time point", the packet transmitting/receiving unit 35 updates the data management table 25 (deletes a record), and updates the routing table 21.

Next, the data management table update processing performed by the packet transmitting/receiving unit 35 will be described with reference to FIG. 27. First, the packet transmitting/receiving unit 35 determines whether a request for transmitting actual data (data packet) is received from the node 10 itself, or whether a data packet to be relayed is received from an adjacent node 10 (step S501). When the packet transmitting/receiving unit 35 does not receive the transmission request or dose not receive a data packet to be relayed (step S501: No), the packet transmitting/receiving unit 35 waits for a transmission request or the like.

On the other hand, when the packet transmitting/receiving unit 35 receives the transmission request or receives a data packet to be relayed (step S501: Yes), the packet transmitting/receiving unit 35 refers to the routing table 21, and extracts three records in which one of the first to the third level flags is set from records whose destination is a node 10 that is the destination of the data packet (step S502). Here, instead of a method in which all the records are extracted, a method in which only the top three records are extracted will be described as an example.

Next, the packet transmitting/receiving unit 35 adds transmission history records with respect to the extracted three records in the data management table 25 (step S503). The packet transmitting/receiving unit 35 sets "ID" for managing data, sets the destination of the data packet in the "destination" (step S504), and sets "waiting time point" of data ACK (step S505). Then, the packet transmitting/receiving unit 35 transmits the data packet (step S506).

Thereafter, the packet transmitting/receiving unit 35 determines whether data ACK from the destination node is received by the "waiting time point" set in the data management table 25 (step S507). When no data ACK is received (step S507: No), the packet transmitting/receiving unit 35 updates the "success coefficient" in the routing table 21 (step S511), updates the "evaluation value" in the routing table 21, and further updates the "priority" (step S512). For example, the packet transmitting/receiving unit 35 updates the "success coefficient" in the routing table 21 from "7" to "8", and updates the "evaluation value" from "57" to "58".

Then, the packet transmitting/receiving unit 35 returns to the processing of step S502. The packet transmitting/receiving unit 35 refers to the updated routing table 21 again, and selects three records in which one of the first to the third level flags is set (step S502). If the records in which one of the first to the third level flags is set are different from the records in the routing table 21 before the update, the packet transmitting/receiving unit 35 can reselect the route on the basis of route quality information obtained when the data packet is actually transmitted.

On the other hand, when data ACK is received by the "waiting time point" (step S507: Yes), the packet transmitting/receiving unit 35 deletes the target record from the data management table 25 (step S508). Then, the packet transmitting/receiving unit 35 updates the "success coefficient" in the routing table 21 (step S509), updates the "evaluation value" in the routing table 21, and further updates the "priority" (step S510).

Effect of Third Embodiment

As described above, in the third embodiment, each node stores a correspondence relationship between the received route information and the obtained quality information (evaluation value) in the routing table. When transmitting a packet to an adjacent node, or relaying a packet received from an adjacent packet, each node calculates quality information of the selected route on the basis of reception condition of the response packet. Then each node replaces the quality information stored in the routing table with the calculated quality information. Then, each node selects route information by comparing the quality information items (quality information items after the replacement) stored in the routing table with respect to each of a plurality of received route information items.

In this way, according the third embodiment, each node can reevaluate the quality of the route and reselect the route on the basis of the route quality information obtained when actually transmitting a data packet.

[d] Other Embodiments

Although the first to the third embodiments of the present invention have been described, the present invention may be implemented in various different forms in addition to the embodiments described above.

On-Demand Method

It is assumed that, in the first to the third embodiments, the route information relay method according to the present invention is applied to a case in which route control is performed by a routing table method. However, the present invention is not limited to this. The route information relay method according to the present invention can also be applied to a case in which route control is performed by an on-demand method and a case in which route control is performed by a hybrid method (a combined method of the routing table method and the on-demand method). In other words, the present invention can be applied to a case in which route control is performed by any method if the method is to relay the route information by each node.

Route Information Items of a Plurality of Nodes

In the first to the third embodiments described above, a case in which a plurality of route information items whose destination is limited to the node "a" are received has been described. However, the present invention is not limited to this. When a plurality of route information items whose destination nodes are the same are received with respect to each of a plurality of nodes, a node can select a route information item for each of the plurality of nodes, combine the selected route information items, and relay the combined route information items. For example, it is assumed that, when the node "x" determines at a predetermined frequency, a plurality of route information items whose destination is the node "b" and a plurality of route information items whose destination is the node "c" are received in addition to a plurality of route information items whose destination is the node "a" (refer to FIG. 2). At this time, the node "x" may combine a highest quality route information item selected with respect to the node "a", a highest quality route information item selected with respect to the node "b", and a highest quality route information item selected with respect to the node "c", and relay the combined highest quality route information items. In this way, the method in which route information items with respect to a plurality of nodes are combined and relayed can further reduce the amount of communication to control the route as compared with the method in which a route information item with respect to a node is relayed individually.

System Configuration or the Like

The processing procedures (FIGS. 16 to 19, FIG. 22, FIG. 27, and the like), specific names, and information including various data and parameters illustrated in the above description and figures can be arbitrarily changed unless otherwise stated. The constituent elements of the devices illustrated in the figures are functionally conceptual, and need not necessarily be physically configured as illustrated (for example, FIG. 3, FIG. 23, and the like). In other words, specific forms of distribution and integration of the devices are not limited to those illustrated in the figures, and all or part of the devices can be functionally or physically distributed or integrated in arbitrary units according to various loads and the state of use. Moreover, all or an arbitrary part of the processing functions performed in each device can be realized by a CPU and a program analyzed and executed by the CPU, or can be realized as hardware by wired logic.

The route control method described in the embodiments can be realized by executing a program prepared in advance by a computer such as a personal computer or a work station. The program can be distributed via a network such as the Internet. The program can be stored in a computer-readable recording medium, such as a hard disk, a flexible disk (FD), a CD-ROM, an MO, and a DVD, and can be executed by being read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A route information relay method for relaying route information executed by a wireless terminal, the route information relay method comprising:
   receiving, by the wireless terminal, route information indicating a route through which a packet is transmitted to a destination wireless terminal, and included in a packet received from first another wireless terminal connected to the wireless terminal, and storing the received route information in a route information table;
   obtaining quality information indicating quality of the route indicated by the received route information;
   determining, at a predetermined frequency, whether a plurality of pieces of route information which packet destination wireless terminals are same are received based on the route information table;
   comparing a plurality of pieces of quality information of the plurality of pieces of route information which packet destination wireless terminals are the same;
   selecting route information corresponding to quality information indicating a highest quality among the plurality of pieces of route information which packet destination wireless terminals are the same; and
   generating a packet including the selected route information and relaying the generated packet, by the wireless terminal, to second another wireless terminal connected to the wireless terminal,
   wherein
   the selecting includes selecting plurality of route information for a plurality of the destination wireless terminals, respectively, and
   the relaying includes combining the selected plurality of route information to relay the combined route information,
   wherein the determining, the comparing, the selecting and the generating are performed at the predetermined frequency set for the wireless terminal irrespective of whether the wireless terminal receives a new packet.

2. The route information relay method according to claim 1, wherein
   the wireless terminal includes the route information table for storing a correspondence relationship between the received route information and quality information obtained when the route information is relayed at the relaying, and
   the relaying includes searching the route information table by using the selected piece of route information, comparing a piece of quality information stored in the route information table corresponding to the selected piece of route information and a piece of quality information obtained when the route information is selected, and when a difference between qualities is greater than or equal to a predetermined threshold value, to relay the selected piece of route information.

3. The route information relay method according to claim 1, the method further comprising:
   when the wireless terminal transmits a packet to the second another wireless terminal connected to the wireless terminal, or when the wireless terminal relays a packet received from the first another wireless terminal connected to the wireless terminal to the second another wireless terminal connected to the wireless terminal, calculating quality information of a route selected to transmit or relay the packet based on reception condition of a response packet responding to the packet, and replacing the quality information stored in the route information table with the calculated quality information, and
   the selecting selects route information by comparing the quality information stored in the route information table with respect to each of a plurality pieces of received route information.

4. A wireless terminal comprising:
   a communication unit including a wirelessly communicable wireless module;
   a memory storing a route information table; and
   a processor coupled to the memory, wherein the processor executes a process comprising:
   receiving route information indicating a route through which a packet is transmitted to a destination wireless terminal, and included in a packet received from first another wireless terminal connected to the wireless terminal, and storing the received route information in the route information table;
   obtaining quality information indicating quality of the route indicated by the route information by the received route information;
   determining, at a predetermined frequency, whether a plurality of pieces of route information which packet destination wireless terminals are same are received based on the route information table;
   comparing a plurality of pieces of quality information of the plurality of pieces of route information which packet destination wireless terminals are the same;

selecting route information corresponding to quality information indicating a highest quality among the plurality of pieces of route information which packet destination wireless terminals are the same; and generating a packet including the selected route information and relaying the generated packet to second another wireless terminal connected to the wireless terminal, wherein
the selecting includes selecting plurality of route information for a plurality of the destination wireless terminals, respectively, and
the relaying includes combining the selected plurality of route information to relay the combined route information, wherein the determining, the comparing, the selecting and the generating are performed at the predetermined frequency set for the wireless terminal irrespective of whether the wireless terminal receives a new packet.

* * * * *